(12) United States Patent
Wang et al.

(10) Patent No.: US 12,276,826 B2
(45) Date of Patent: Apr. 15, 2025

(54) BACKLIGHT MODULE AND DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Nan Wang, Beijing (CN); Yong Shu, Beijing (CN); Qi Cao, Beijing (CN); Xian Wang, Beijing (CN); Ming Wang, Beijing (CN); Quan Tong, Beijing (CN); Yinggang Liu, Beijing (CN); Chengyi Xu, Beijing (CN); Xiaofei Zhu, Beijing (CN); Junjie Jiang, Beijing (CN)

(73) Assignees: CHONGQING BOE OPTOELECTRONICS TECHNOLOGY CO., LTD, Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,413

(22) PCT Filed: Jun. 29, 2022

(86) PCT No.: PCT/CN2022/102546
§ 371 (c)(1),
(2) Date: Mar. 23, 2023

(87) PCT Pub. No.: WO2024/000327
PCT Pub. Date: Jan. 4, 2024

(65) Prior Publication Data
US 2024/0353608 A1    Oct. 24, 2024

(51) Int. Cl.
*F21V 8/00*    (2006.01)

(52) U.S. Cl.
CPC ......... *G02B 6/0038* (2013.01); *G02B 6/0028* (2013.01); *G02B 6/0073* (2013.01)

(58) Field of Classification Search
CPC ... G02B 6/0038; G02B 6/0028; G02B 6/0073
See application file for complete search history.

(56) References Cited

U.S. PATENT DOCUMENTS

| | | | |
|---|---|---|---|
| 6,123,430 A | 9/2000 | Ono et al. | |
| 2010/0296284 A1* | 11/2010 | Kawashima | G02B 6/0068 362/235 |

(Continued)

FOREIGN PATENT DOCUMENTS

| | | | |
|---|---|---|---|
| CN | 201072481 Y * | 6/2008 | ......... G02F 1/13357 |
| CN | 103217733 A | 7/2013 | |

(Continued)

OTHER PUBLICATIONS

English Machine Translation of Chen et al CN 201072481 (Year: 2024).*

*Primary Examiner* — Donald L Raleigh
(74) *Attorney, Agent, or Firm* — IP & T GROUP LLP

(57) ABSTRACT

A backlight module includes a rear housing, a light guide plate and a light source. The rear housing includes a bottom wall and a side wall that are connected to each other; the bottom wall and the side wall enclose an accommodation cavity. The light guide plate is located in the accommodation cavity. The light source is located in the accommodation cavity and located between the side wall and a side surface of the light guide plate. The light source includes a circuit board and a plurality of light-emitting devices that are mounted on the circuit board. A surface of the circuit board away from the plurality of light-emitting devices faces the (Continued)

side wall, and light-emitting surfaces of the plurality of light-emitting devices face the side surface of the light guide plate.

19 Claims, 13 Drawing Sheets

(56) References Cited

U.S. PATENT DOCUMENTS

| | | |
|---|---|---|
| 2014/0204607 A1 | 7/2014 | Yan |
| 2015/0085221 A1 | 3/2015 | Zhang et al. |
| 2016/0062023 A1* | 3/2016 | Itoh ..................... G02B 6/0026 362/608 |
| 2017/0371095 A1 | 12/2017 | Tokunaga et al. |
| 2021/0286117 A1* | 9/2021 | Masuda ................ G02B 6/009 |
| 2021/0333468 A1 | 10/2021 | Li et al. |

FOREIGN PATENT DOCUMENTS

| | | |
|---|---|---|
| CN | 203686916 U | 7/2014 |
| CN | 102691934 B | 9/2014 |
| CN | 103162182 B | 4/2015 |
| CN | 104501048 A | 4/2015 |
| CN | 205246928 U | 5/2016 |
| CN | 107544111 A | 1/2018 |
| CN | 108845454 A | 11/2018 |
| CN | 109541847 A | 3/2019 |
| CN | 110501844 A | 11/2019 |
| CN | 111161641 A | 5/2020 |
| CN | 212675216 U | 3/2021 |
| CN | 213240750 U | 5/2021 |

* cited by examiner

182

18210/1821

13

1821/182 b1

BACKLIGHT MODULE AND DISPLAY APPARATUS

CROSS-REFERENCE TO RELATED APPLICATION

This application is a national phase entry under 35 USC 371 of International Patent Application No. PCT/CN2022/102546, filed on Jun. 29, 2022, which is incorporated herein by reference in its entirety.

TECHNICAL FIELD

The present disclosure relates to the field of display technologies, and in particular, to a backlight module and a display apparatus.

BACKGROUND

With the rapid development of liquid crystal display technologies, the liquid crystal display technologies have been widely used in various industries. It is well known that liquid crystals cannot emit light by themselves. Therefore, it is necessary to provide a backlight module used for enabling a display apparatus to emit light, and advantages and disadvantages of performance of the backlight module directly affect a display quality of the display apparatus. As a main component of the display apparatus, the backlight module mainly provides an even and high-luminance light source for a liquid crystal display panel.

SUMMARY

In an aspect, a backlight module is provided. The backlight module includes a rear housing, a light guide plate and a light source. The rear housing includes a bottom wall and a side wall that are connected to each other; the bottom wall and the side wall define an accommodation cavity. The light guide plate is located in the accommodation cavity. The light source is located in the accommodation cavity and located between the side wall and a side surface of the light guide plate. The light source includes a circuit board and a plurality of light-emitting devices that are mounted on the circuit board. A surface of the circuit board away from the plurality of light-emitting devices faces the side wall, and light-emitting surfaces of the plurality of light-emitting devices face the side surface of the light guide plate.

In some embodiments, the plurality of light-emitting devices are arranged in at least one row in a first direction, and the first direction is perpendicular to a thickness direction of the bottom wall.

In some embodiments, the plurality of light-emitting devices are arranged in at least two rows, and two adjacent rows of light-emitting devices are aligned with each other.

In some embodiments, the plurality of light-emitting devices are arranged in at least two rows, and two adjacent rows of light-emitting devices are staggered.

In some embodiments, at least one light-emitting device of the plurality of light-emitting devices is a mini light-emitting diode.

In some embodiments, the light guide plate includes side surfaces; at least a part of the side surfaces of the light guide plate is a light incident surface, and the light incident surface faces the light-emitting surfaces of the light-emitting devices; the light incident surface has a first light adjustment structure, and the first light adjustment structure is configured to disperse light emitted by the plurality of light-emitting devices.

In some embodiments, the first light adjustment structure includes a plurality of first adjustment portions arranged in a first direction, and the first direction is perpendicular to a thickness direction of the bottom wall; a light-emitting surface of a light-emitting device of the plurality of light-emitting devices faces a first adjustment portion of the plurality of first adjustment portions.

In some embodiments, a distance between centers of two adjacent first adjustment portions is in a range from 25 μm to 40 μm, inclusive.

In some embodiments, the first adjustment portion is a concave surface of which a middle is deep and two sides are shallow; a center line of the light-emitting device is located or substantially located in a plane of symmetry of the concave surface.

In some embodiments, the concave surface includes a cambered surface or a surface in a shape of "V"; and/or a depth of the concave surface is in a range from 50 μm to 120 μm, inclusive.

In some embodiments, the light guide plate includes a first plate and a second plate that are connected to each other, and the first plate is located between the second plate and the light source; a surface of the second plate away from the bottom wall has a second light adjustment structure, the second light adjustment structure includes a plurality of second adjustment portions, and the plurality of second adjustment portions are arranged in a first direction and each extend in a second direction; the first direction and the second direction intersect and are each perpendicular to a thickness direction of the bottom wall.

In some embodiments, the light guide plate includes a third plate and a fourth plate that are connected to each other, and the third plate is located between the fourth plate and the light source; a surface of the third plate proximate to the bottom wall has a plurality of first mesh structures; a surface of the fourth plate proximate to the bottom wall has a plurality of second mesh structures; a light mixing capability of the plurality of first mesh structures is stronger than a light mixing capability of the plurality of second mesh structures, and a light collimation capability of the plurality of second mesh structures is stronger than a light collimation capability of the plurality of first mesh structures.

In some embodiments, the plurality of first mesh structures and the plurality of second mesh structures are arranged in at least one of following manners: at least one first mesh structure of the plurality of first mesh structures is an annular pit; alternatively, at least one first mesh structure of the plurality of first mesh structures is an annular pit; in a direction from a bottom to an opening of the annular pit, an inner diameter of the annular pit gradually decreases, and/or an outer diameter of the annular pit gradually increases; alternatively, at least one first mesh structure of the plurality of first mesh structures is an annular pit, a depth of the annular pit is in a range from 2 μm to 4 μm, inclusive, and a maximum width of an outer diameter of the closed annular pit is in a range from 40 μm to 60 μm, inclusive; alternatively, at least one second mesh structure of the plurality of second mesh structures includes a first tapered pit defined by a plane and a curved surface; alternatively, at least one second mesh structure of the plurality of second mesh structures includes a second tapered pit defined by at least three planes; the second tapered pit includes a first edge and a second edge, a length of the first edge is greater than a length of the second edge, and an included angle between the first edge and the second edge is an obtuse angle; alternatively, a section, taken along a thickness direction of the light guide plate, of at least one second mesh structure of the plurality of second mesh structures is substantially in a shape of an obtuse triangle; alternatively, in a direction from the third plate to the fourth plate, an arrangement density of the plurality of first mesh structures gradually increases, and an arrangement density of the plurality of second mesh structures gradually increases.

In some embodiments, the rear housing further includes an extension plate, the extension plate is connected to an end of the side wall away from the bottom wall, and the extension plate extends in a third direction; the third direction is from the side wall to the accommodation cavity. The backlight module further includes a first light shielding portion located on a side of the extension plate away from the bottom wall and covering the light source, and a second light shielding portion located between the light source and the side wall.

In some embodiments, the backlight module further includes a third light shielding portion having a connection groove. The side wall is embedded in the connection groove; the third light shielding portion is closer to the side wall than the light source; an orthographic projection of the light source on the side wall is located within an orthographic projection of the third light shielding portion on the side wall.

In some embodiments, the backlight module further includes a mold frame including a first extension portion located between the light source and the side wall, a fourth light shielding portion located between the light source and the first extension portion, and a fifth light shielding portion located between the first extension portion and the side wall.

In some embodiments, the backlight module further includes a sixth light shielding portion covering an end of the side wall away from the bottom wall and an end of the first extension portion away from the bottom wall.

In some embodiments, the mold frame further includes a second extension portion, the second extension portion is connected to an end of the first extension portion away from the bottom wall, and the second extension portion extends in a third direction; the third direction is from the side wall to the accommodation cavity. The backlight module further includes a sixth light shielding portion, and the sixth light shielding portion covers an end of the side wall away from the bottom wall, the end of the first extension portion away from the bottom wall and an end of the second extension portion away from the bottom wall.

In some embodiments, the backlight module further includes a reflective sheet located between the light guide plate and the bottom wall, and/or a light adjustment assembly located on a light exit side of the light guide plate.

In another aspect, a display apparatus is provided. The display apparatus includes the backlight module as described in any one of the above embodiments, and a liquid crystal display panel located on a light exit side of the backlight module.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
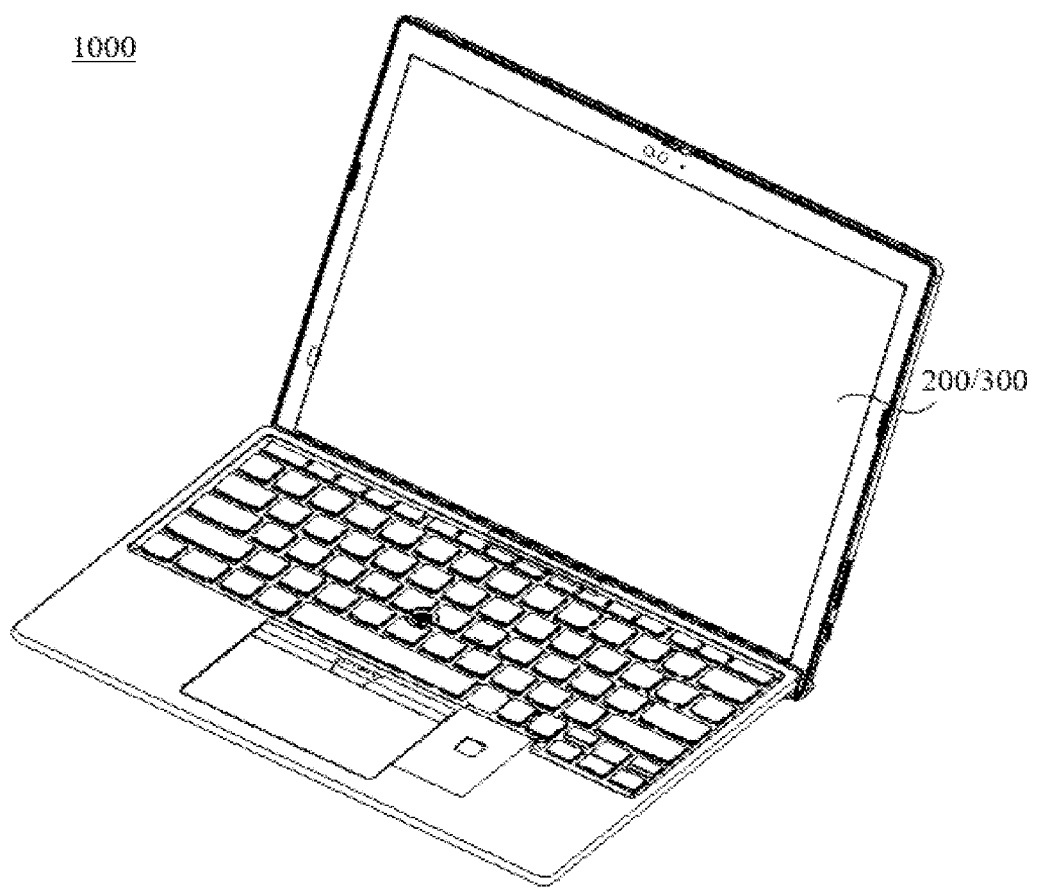
FIG. 1 is a diagram showing a structure of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

Additionally, the phase "based on" as used herein is meant to be open and inclusive, since a process, a step, a calculation or other action that is "based on" one or more of stated conditions or values may, in practice, be based on additional conditions or values beyond those stated.

As used herein, the term such as "parallel", "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be that, for example, a difference between the two that are equal is less than or equal to 5% of either of the two.

It will be understood that, in a case where a layer or an element is referred to as being on another layer or a substrate, it may be that the layer or the element is directly on the another layer or the substrate, or there may be a middle layer between the layer or the element and the another layer or the substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a display apparatus. FIG. 1 is a diagram showing a structure of the display apparatus, in accordance with some embodiments. Referring to FIG. 1, the display apparatus 1000 is a product having a function of displaying images (including an image in stationary or an image in motion (which may be a video)). For example, the display apparatus 1000 may be any one of a display, a television, a billboard, a digital photo frame, a laser printer having a display function, a telephone, a mobile phone, a personal digital assistant (PDA), a digital camera, a portable camcorder, a view finder, a navigator, a vehicle, a large-area wall, a household appliance, an information inquiry device (e.g., a business inquiry device for a department of e-government, bank, hospital, electricity or the like) and a monitor.

Figure 2:
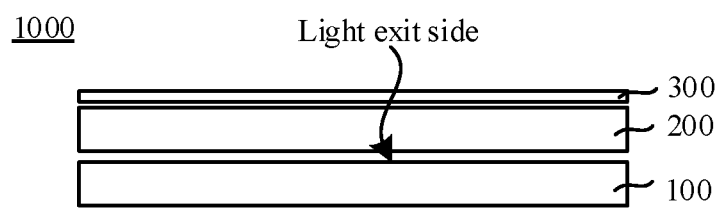
FIG. 2 is a sectional view showing a structure of a display apparatus, in accordance with some embodiments.

FIG. 2 is a sectional view showing the structure of the display apparatus, in accordance with some embodiments.

In some embodiments, the display apparatus 1000 is a liquid crystal display (LCD). In this case, referring to FIGS. 1 and 2, the display apparatus 1000 includes a backlight module 100 (blocked in FIG. 1) and a liquid crystal display panel 200. The liquid crystal display panel 200 is located on a light exit side of the backlight module 100, and the backlight module 100 is used for providing light for the liquid crystal display panel 200. On this basis, referring to FIGS. 1 and 2, the display apparatus 1000 may further include a protective cover plate 300; the protective cover plate 300 is located on a side of the liquid crystal display panel 200 away from the backlight module 100, and the protective cover plate 300 is used for protecting the liquid crystal display panel 200.

Figure 3:
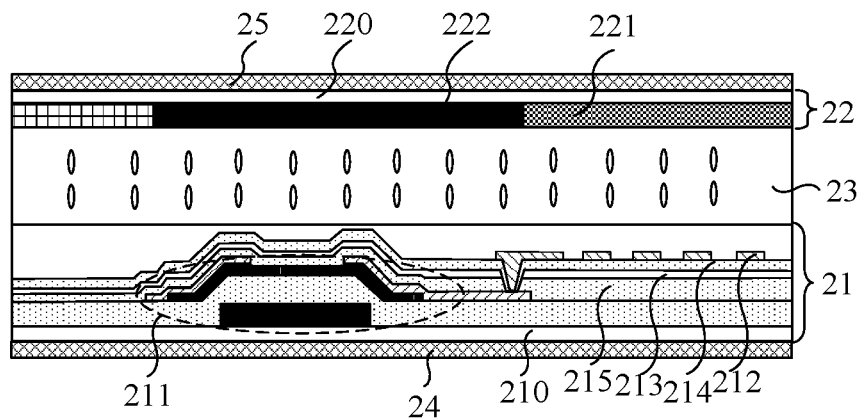
FIG. 3 is a sectional view showing a structure of a liquid crystal display panel, in accordance with some embodiments.

FIG. 3 is a sectional view showing a structure of the liquid crystal display panel, in accordance with some embodiments.

Referring to FIG. 3, a structure of the liquid crystal display panel 200 mainly includes an array substrate 21, an opposite substrate 22, a liquid crystal layer 23, a first polarizer 24 and a second polarizer 25. The liquid crystal layer 23 is located between the array substrate 21 and the opposite substrate 22. The first polarizer 24 is located on a side of the array substrate 21 away from the liquid crystal layer 23, and the second polarizer 25 is located on a side of the opposite substrate 22 away from the liquid crystal layer 23.

As shown in FIG. 3, all sub-pixels of the array substrate 21 are each provided with a thin film transistor 211 and a pixel electrode 212 that are located on a first substrate 210. The thin film transistor 211 includes an active layer, a source, a drain, a gate and a gate insulating layer, the source and the drain are in contact with the active layer, and the pixel electrode 212 is electrically connected to the drain of the thin film transistor 211.

In some embodiments, as shown in FIG. 3, the array substrate 21 further includes a common electrode 213 disposed on the first substrate 210. The pixel electrode 212 and the common electrode 213 may be disposed in a same layer. In this case, the pixel electrode 212 and the common electrode 213 are each of a comb-tooth structure including a plurality of strip-shaped sub-electrodes. The pixel electrode 212 and the common electrode 213 may be disposed in different layers. In this case, as shown in FIG. 3, a first insulating layer 214 is provided between the pixel electrode 212 and the common electrode 213. In a case where the common electrode 213 is disposed between the thin film transistor 211 and the pixel electrode 212, as shown in FIG. 3, a second insulating layer 215 is provided between the common electrode 213 and the thin film transistor 211. In some other embodiments, the opposite substrate 22 includes the common electrode 213.

As shown in FIG. 3, the opposite substrate 22 includes a color filter layer 221 disposed on a second substrate 220. In this case, the opposite substrate 22 may be also referred to as a color filter (CF) substrate. The color filter layer 221 includes at least red photoresist units, green photoresist units and blue photoresist units, and the red photoresist units, the green photoresist units and the blue photoresist units may be directly opposite to the sub-pixels of the array substrate 21 in a one-to-one correspondence. The opposite substrate 22 further includes black matrix patterns 222 disposed on the second substrate 220, and the black matrix patterns 222 are used for spacing the red photoresist units, the green photoresist units and the blue photoresist units.

Figure 4:
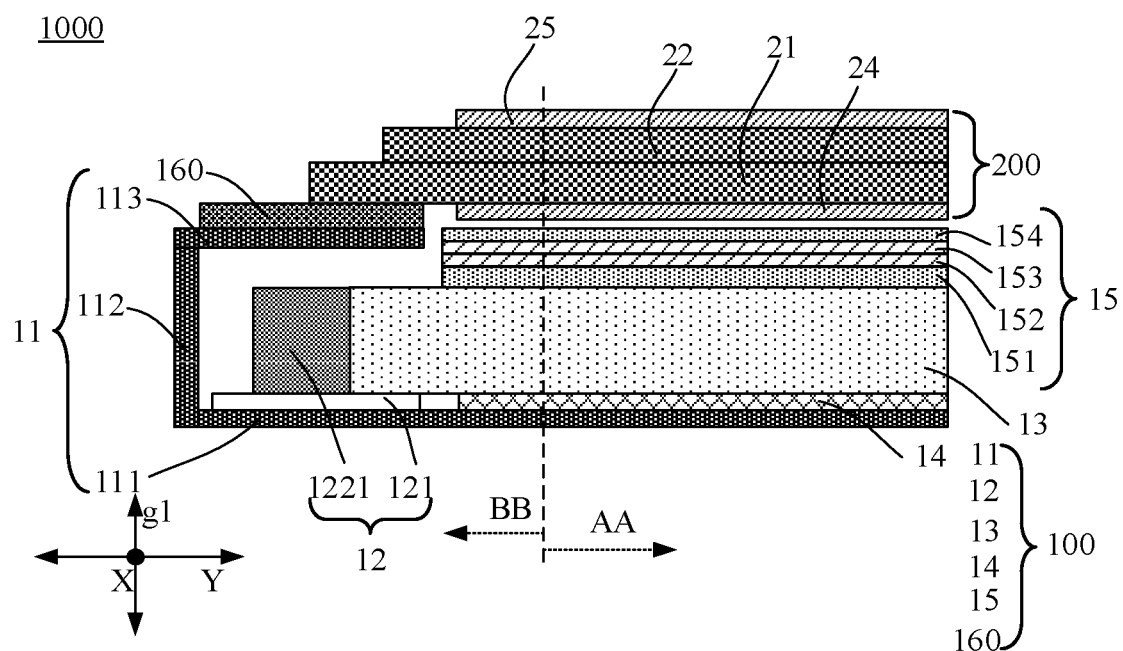
FIG. 4 is a sectional view showing a structure of a display apparatus in the related art.

FIG. 4 is another sectional view showing the structure of the display apparatus in the related art.

Referring to FIG. 4, the display apparatus 1000 includes the backlight module 100 and the liquid crystal display panel 200. It will be understood that only the array substrate 21, the opposite substrate 22, the first polarizer 24 and the second polarizer 25 of the liquid crystal display panel 200 are shown in FIG. 4 for an illustration.

As shown in FIG. 4, the backlight module 100 includes a rear housing 11, a light source 12, a light guide plate 13, a reflective sheet 14 and a light adjustment assembly 15. The light source 12, the light guide plate 13, the reflective sheet 14 and the light adjustment assembly 15 are all located in the rear housing 11. The rear housing 11 includes a bottom wall 111 and a side wall 112. A back surface of the light source 12 is attached to a border of the bottom wall 111, and a light-emitting surface of the light source 12 faces a side surface of the light guide plate 13. That is, the backlight module 100 is of an edge-lit structure. The reflective sheet 14 is located between the light guide plate 13 and the bottom wall 111. The light adjustment assembly 15 is located on a side of the light guide plate 13 away from the bottom wall 111.

In this example, light emitted by the light source 12 may enter the light guide plate 13 through the side surface of the light guide plate 13. Light emitted from the light guide plate 13 to the bottom wall 111 may be reflected by the reflective sheet 14, thereby improving a light exit efficiency on the side of the light guide plate 13 away from the bottom wall 111. The light adjustment assembly 15 may achieve effects of homogenizing light and improving the brightness. For example, as shown in FIG. 4, the light adjustment assembly 15 may include a lower diffusion sheet 151, at least one prism lens (e.g., a lower prism lens 152 and an upper prism lens 153) and an upper diffusion sheet 154 that are arranged in a stack. For example, the lower diffusion sheet 151, the lower prism lens 152, the upper prism lens 153 and the upper diffusion sheet 154 are sequentially arranged away from the light guide plate 13. The lower prism lens 152 and the upper prism lens 153 are each used for improving the brightness of the light; the lower diffusion sheet 151 and the upper diffusion sheet 154 are each used for enhancing the effect of homogenizing light.

As shown in FIG. 4, in some examples, the rear housing 11 may further include an extension plate 113, the extension plate 113 is connected to the side wall 112, and the extension plate 113 may be used for supporting the liquid crystal display panel 200. For example, the light source 12 is located in an accommodation space defined by the extension plate 113, the side wall 112 and the bottom wall 111. The backlight module 100 further includes a light shielding adhesive 160, the light shielding adhesive 160 is located on a side of the extension plate 113 away from the light source 12, and the light shielding adhesive 160 is located between the extension plate 113 and the liquid crystal display panel 200. The light shielding adhesive 160 may block the light leaked from the light source 12 to a side where the extending plate 113 is located, thereby ameliorating a problem of light leakage at an edge of the display apparatus 1000.

For example, as shown in FIG. 4, the light source 12 includes a circuit board 121 and a light-emitting diode (LED) light bar that is mounted on a front surface of the circuit board 121, the LED light bar extends in a first direction X, and the first direction X is perpendicular to a thickness direction g1 of the bottom wall 111. The LED light bar includes a plurality of LEDs 1221 (i.e., LED chips).

It is worth pointing out that, in the backlight module 100 of some of the above examples, as shown in FIG. 4, the light source 12 is attached to the border of the bottom wall 111 by a back surface of the circuit board 121; in this case, limited by welding and encapsulating of the LED chips of the light source 12, a cutting requirement for the circuit board 121 of the light source 12 and an assembly manner of the light source 12 in the backlight module 100, a distance between an LED chip and another LED chip of the light source 12 is relatively large, which causes a dimension of the light source 12 in a second direction Y, that is perpendicular to the thickness direction g1 of the bottom wall 111 and intersects (e.g., being perpendicular to) the first direction X, to be relatively large, so that a space in the backlight module 100 occupied by the light source 12 in the second direction Y is relatively large. As a result, in a case where the backlight module 100 is applied to the display apparatus 1000, it is difficult for the display apparatus 1000 to realize a narrow bezel.

In addition, the distance between the LED chip and the another LED chip of the light source 12 is relatively large. Therefore, in a case where a light mixing distance of the light guide plate 13 is insufficient, a hotspot phenomenon is prone to occur in the light guide plate 13, which affects a display quality of the display apparatus 1000. The hotspot phenomenon refers to a phenomenon of uneven brightness. In the phenomenon of uneven brightness, a light intensity of a part, located in a middle, of light emitted by all LED chips is relatively high due to limitations of a light-emitting angle (which is generally 120°) and other conditions of the LED chip, and thus the brightness at a corresponding position of the light guide plate 13 is relatively high; a light intensity at a junction of light emitted by two adjacent LED chips is relatively low due to a relatively large distance between the two adjacent LED chips, and thus the brightness at another corresponding position of the light guide plate 13 is relatively low.

It will be noted that pins of the LED chips need to be welded to the circuit board 121, and the distance between the LED chip and the another LED chip is relatively large due to the influence of the welding angle and the welding accuracy.

In some examples, the circuit board 121 is provided with a transient voltage suppressor (TVS) thereon, and the TVS is located between an LED chip and another LED chip. The provision of the TVS may avoid an electrostatic interference and affect a luminous effect; moreover, the distance between the LED chip and the another LED chip is further increased.

The LED light bar may be formed after the LED chips are encapsulated. However, the distance between the LED chip and the another LED chip is increased, so that an area of an encapsulation region occupied by the encapsulated LED chips is increased accordingly. Therefore, an area of the circuit board 121 needs to be increased accordingly, thereby further increasing the dimension of the light source in the second direction Y.

When the light source 12 is being manufactured, in order to reduce a cost and simplify a process, there is a need to form multiple LED chips on a circuit board motherboard firstly and then cut the circuit board motherboard, so that a plurality of light sources 12 each including the circuit board 121 and the LED chips are formed. However, in order to prevent connections of lines from being affected, there is a need to ensure a sufficient cutting width. For example, after the cutting, as shown in FIG. 4, there is a need to reserve a relatively large size, e.g., at least 0.5 mm, between the LED chip and an edge of the circuit board 121.

With continued reference to FIG. 4, another edge of the circuit board 121 may extend between the light guide plate 13 and the bottom wall 111. In this case, the reflective sheet 14 needs to be contracted inwards to avoid the circuit board 121 (there is a need to provide a mounting gap (e.g., at least 0.2 mm) between the reflective sheet 14 and the circuit board 121), so as to avoid mutual interferences due to factors such as expansion and deformation of the reflective sheet 14 and/or the circuit board 121.

As shown in FIG. 4, the display apparatus 1000 includes a display region AA and a bezel region BB. There is a need to reserve a relatively large dimension between the LED chip and the edge of the circuit board 121 and provide a mounting gap between the reflective sheet 14 and the circuit board 121. Thus, an edge of the reflective sheet 14 facing the light source 12 is prone to be contracted to be in the display region AA in the display apparatus 1000, which is not shown in FIG. 4. As a result, there is the reflective sheet 14 in a portion of the display region AA (that is, the portion of the display region AA is relatively dark), and there is no reflective sheet 14 in the other portion of the display region AA (that is, the other portion of the display region AA is relatively bright), so that light in a junction of the two regions has a difference in brightness.

The edge of the circuit board 121 is close to the side wall 112. Thus, another mounting gap needs to be provided between the two, so as to avoid mutual interferences due to factors such as expansion and deformation of the side wall 112 and/or the circuit board 121. In this case, a width of a bezel of the display apparatus 1000 is further increased.

In summary, for the display apparatus 1000 shown in FIG. 4, limited by the welding and the encapsulating of the LEDs of the light source 12, the cutting requirement for the circuit board 121 of the light source 12 and the assembly manner of the light source 12 in the backlight module 100, the distance between the LED chip and the another LED chip of the light source 12 is caused to be relatively large, which causes the dimension of the light source 12 in the second direction Y to be relatively large, so that the space in the backlight module 100 occupied by the light source 12 in the second direction Y is relatively large. As a result, in the case where the backlight module 100 is applied to the display apparatus 1000, the phenomenon of uneven brightness is prone to occur in the display apparatus 1000, and it is difficult to achieve the narrow bezel.

Figure 5:
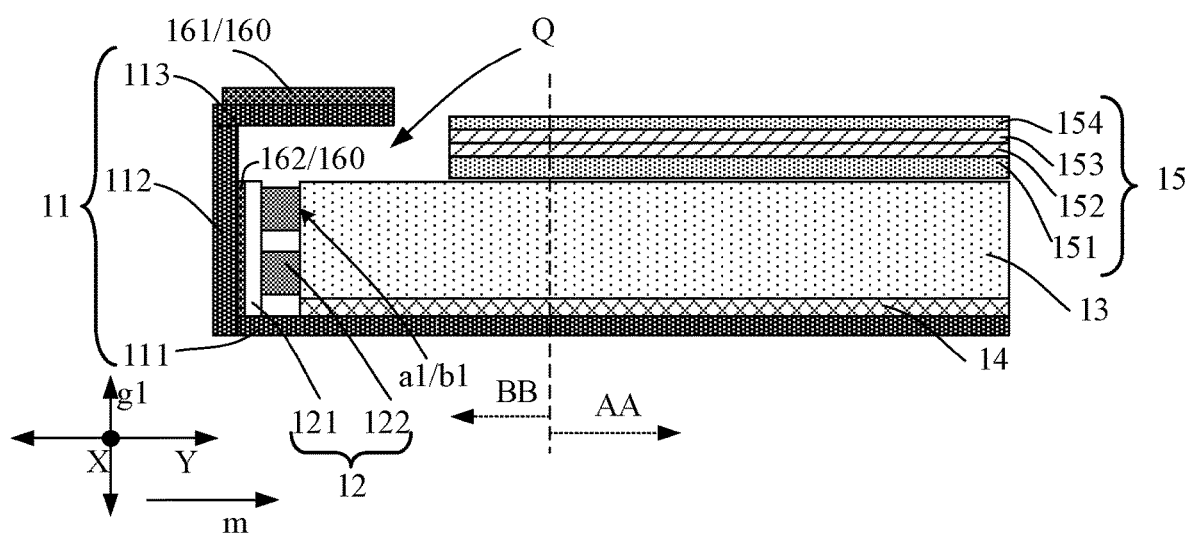
FIG. 5 is a sectional view showing a structure of a backlight module, in accordance with some other embodiments.
Figure 6:
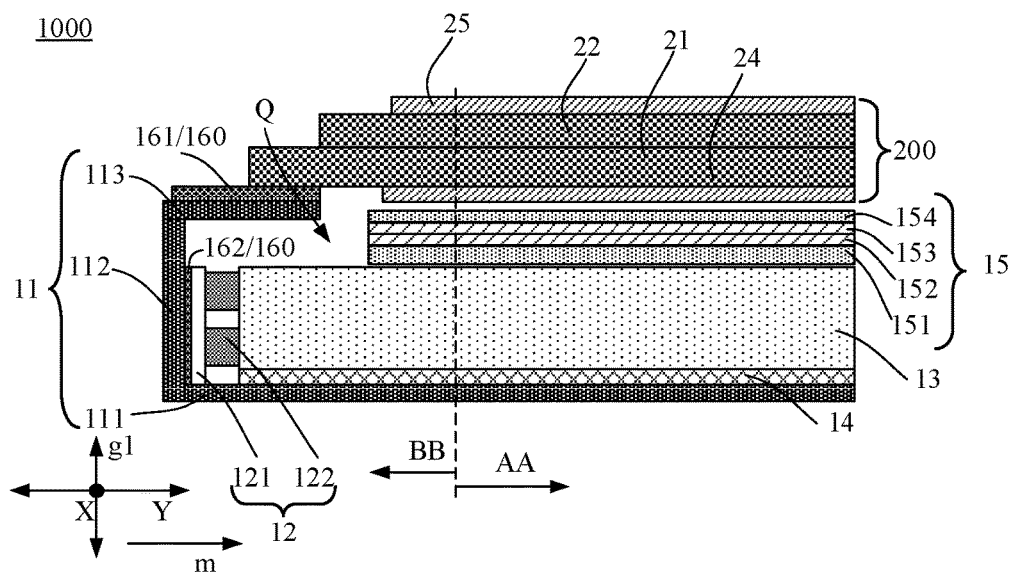
FIG. 6 is a diagram showing a structure of a display apparatus, in accordance with some other embodiments.

FIG. 5 is a sectional view showing a structure of a backlight module, in accordance with some embodiments of the present disclosure. FIG. 6 is a sectional view showing a structure of a display apparatus, in accordance with some embodiments of the present disclosure. It will be understood that only the array substrate 21, the opposite substrate 22, the first polarizer 24 and the second polarizer 25 of the liquid crystal display panel 200 are shown in FIG. 6 for an illustration.

Referring to FIG. 5, some embodiments of the present disclosure provide a backlight module 100. The backlight module 100 includes a rear housing 11, a light source 12 and a light guide plate 13.

The rear housing 11 includes a bottom wall 111 and a side wall 112 that are connected to each other, and the bottom wall 111 and the side wall 112 defines an accommodation cavity Q.

The light source 12 and the light guide plate 13 are both located in the accommodation cavity Q. The light source 12 is located between the side wall 112 and a side surface of the light guide plate 13. That is, the backlight module 100 is of an edge-lit structure. With this design, it is conducive to reducing a thickness of the backlight module 100.

The light source 12 includes a circuit board 121 and a plurality of light-emitting devices 122 that are mounted on the circuit board 121. In some examples, the light-emitting devices 122 may be LEDs (LED chips). In this case, the plurality of light-emitting devices may be located in a same lampshade, so as to form an LED light bar.

A surface of the circuit board 121 away from the plurality of light-emitting devices 122 faces the side wall 112. For example, the surface of the circuit board 121 away from the plurality of light-emitting devices 122 may be directly or indirectly connected to the side wall 112.

Light-emitting surfaces a1 of the plurality of light-emitting devices 122 face the side surface (i.e., a light incident surface b1) of the light guide plate 13. For example, as shown in FIG. 5, the light-emitting surfaces a1 of the plurality of light-emitting devices 122 may be in direct contact with the side surface (i.e., the light incident surface b1) of the light guide plate 13.

In the backlight module 100 provided in the embodiments of the present disclosure, the surface, that is away from the plurality of light-emitting devices 122, of the circuit board 121 of the light source 12 faces the side wall 112, and the light-emitting surfaces a1 of the plurality of light-emitting devices 122 face the side surface (i.e., the light incident surface b1) of the light guide plate 13. Therefore, there is no need to provide a mounting gap between an edge of the circuit board 121 and the side wall 112. That is, a distance between the light guide plate 13 and the side wall 112 may be reduced, which may enable a bezel region BB of the display apparatus 1000 to be relatively narrow in a case where the backlight module 100 is applied to the display apparatus 1000 (as shown in FIG. 6), so as to improve a screen-to-body ratio (i.e., a ratio of an area of a display surface of the display apparatus 1000 to an area of a front surface thereof). Furthermore, another edge of the circuit board 121 does not need to extend between the light guide plate 13 and the bottom wall 111, and thus, in a case where a reflective sheet 14 (as shown in FIGS. 5 and 6) is provided, the reflective sheet 14 does not need to be contracted. As a result, a phenomenon of uneven brightness, caused by a fact that there is the reflective sheet 14 in a portion of a display region AA and there is no reflective sheet 14 in the other portion thereof, will not occur.

In addition, it will be noted that, as can be seen from the above descriptions, in a case where the light-emitting devices are the LED chips, welding and encapsulating of the LED chips, a cutting requirement for the circuit board 121 and an additional provision of the TVS each affect only a dimension of the light source 12 in a direction (e.g., the second direction Y) perpendicular to a thickness direction of the circuit board 121, so that the dimension of the light source 12 in the direction (e.g., the second direction Y) perpendicular to the thickness direction of the circuit board 121 is increased. Therefore, in some of the above embodiments, the surface, that is away from the plurality of light-emitting devices 122, of the circuit board 121 of the light source 12 faces the side wall 112, and the light-emitting surfaces a1 of the plurality of light-emitting devices 122 face the side surface (i.e., the light incident surface b1) of the light guide plate 13, so that the distance between the light guide plate 13 and the side wall 112 is not affected by the above factors. That is, the distance between the light guide plate 13 and the side wall 112 may be reduced. In this way, in the case where the backlight module 100 is applied to the display apparatus 1000 (as shown in FIG. 6), the bezel region BB of the display apparatus 1000 is enabled to be relatively narrow, which is conducive to achieving the narrow bezel.

In some embodiments, with continued reference to FIG. 5, an edge of a light adjustment assembly 15 extends from the display region AA to the bezel region BB. For example, a distance by which the edge of the light adjustment assembly 15 exceeds a border of the display region AA may be 1.2 mm or more. In this case, it is possible to effectively prevent light that has not been adjusted by the light adjustment assembly 15 from being leaked to a portion of the liquid crystal display panel 200 located in the display region AA, which is conducive to ensuring even brightness of a displayed image.

In some embodiments, as shown in FIGS. 5 and 6, the rear housing 11 further includes an extension plate 113, the extension plate 113 is connected to an end of the side wall 112 away from the bottom wall 111, and the extension plate 113 extends in a third direction m. The third direction m is from the side wall 112 to the accommodation cavity Q. It will be understood that, in FIGS. 5 and 6, the third direction m is parallel to the second direction Y. The extension plate 113 may be used for supporting the liquid crystal display panel 200.

For example, a dimension of the extension plate 113 in the third direction m may be greater than or equal to 3 times a wall thickness of the rear housing 11. For example, the wall thickness of the rear housing 11 may be in a range from 0.2 mm to 0.4 mm, inclusive.

For example, the wall thickness of the rear housing 11 may be approximately 0.33 mm. In this case, the dimension of the extension plate 113 in the third direction m may be greater than or equal to 1 mm. Here, it is worth pointing that the dimension of the extension plate 113 in the third direction m may depend on the distance by which the light adjustment assembly 15 exceeds the display region AA, and the two may be negative correlation with each other.

For example, as shown in FIGS. 5 and 6, the backlight module 100 further includes a first light shielding portion 161, the first light shielding portion 161 is located on a side of the extension plate 113 away from the bottom wall 111, and the first light shielding portion 161 covers the light source 12 in a thickness direction g1 of the bottom wall 111. In this case, the first light shielding portion 161 may be used for blocking the light leaked from the light source 12 to a side of the light source 12 away from the bottom wall 111, thereby preventing a display effect of the display apparatus 1000 from being affected due to a light leakage of the display module 100. The first light shielding portion 161 may be a light shielding adhesive 160 (e.g., a double-sided adhesive). The first light shielding portion 161 is provided as the light shielding adhesive 160, and has a certain buffering effect, which facilitates fixing of the liquid crystal display panel 200.

For example, as shown in FIGS. 5 and 6, the backlight module 100 further includes a second light shielding portion 162, and the second light shielding portion 162 is located between the light source 12 and the side wall 112. In this case, the second light shielding portion 162 may be used for blocking the light leaked from the light source 12 to a side of the light source 12 away from the side wall 112, thereby preventing the display effect of the display apparatus 1000 from being affected due to the light leakage of the display module 100. The second light shielding portion 162 may be another light shielding adhesive 160 (e.g., a double-sided adhesive). The second light shielding portion 162 is provided as the another light shielding adhesive 160, which facilitates fixing of the light source 12.

It will be understood that the first light shielding portion 161 and the second light shielding portion 162 may be both disposed in the backlight module 100, or any one of the first light shielding portion 161 and the second light shielding portion 162 may be disposed in the backlight module 100, which is not limited in the embodiments of the present disclosure.

It will be noted that a space occupied, in the third direction m, by the structure shown in FIG. 5 is narrower than a space occupied, in the third direction m, by the structure shown in FIG. 4. Therefore, in the embodiments of the present disclosure, the dimension of the extension plate 113 in the third direction m and a dimension of the first light shielding portion 161 in the third direction m may be both set to be small, which is conducive to achieving the narrow bezel.

Figure 7:
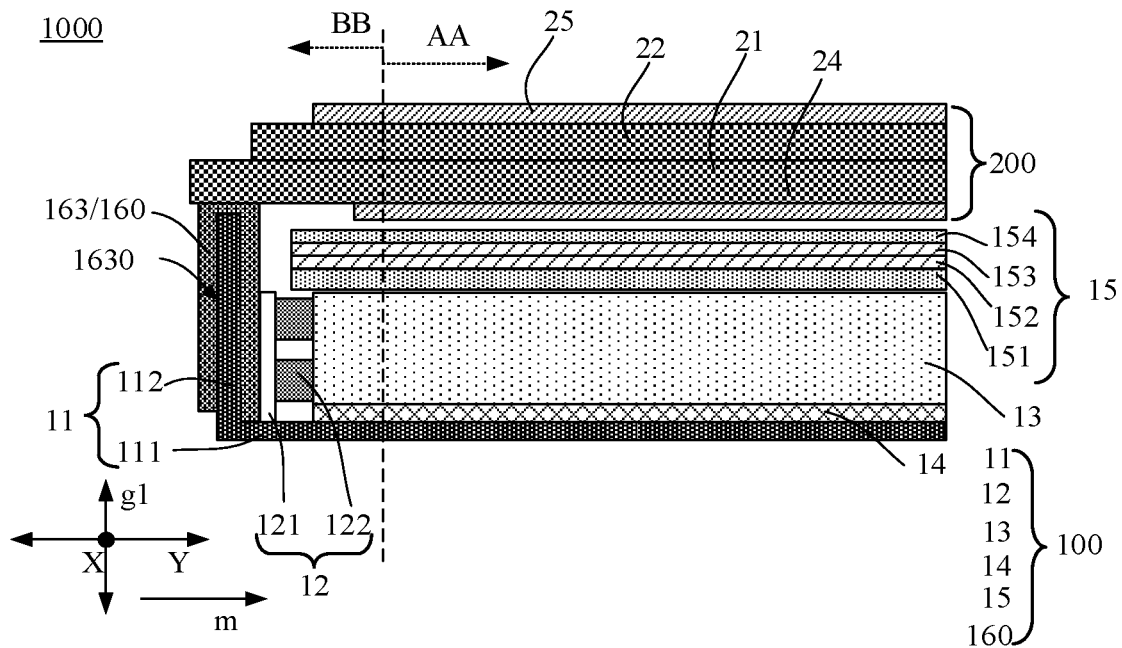
FIG. 7 is a sectional view showing a structure of a display apparatus, in accordance with yet other embodiments.

FIG. 7 is a sectional view showing a structure of a display apparatus, in accordance with yet other embodiments of the present disclosure. It will be understood that only the array substrate 21, the opposite substrate 22, the first polarizer 24 and the second polarizer 25 of the liquid crystal display panel 200 are shown in FIG. 7 for an illustration. A backlight module 100 may include a rear housing 11, a light source 12, a light guide plate 13, a reflective sheet 14 and a light adjustment assembly 15. The light source 12 also adopts a "side-attached" manner. That is, a surface, away from a plurality of light-emitting devices 122, of a circuit board 121 of the light source 12 faces a side wall 112, and light-emitting surfaces of the plurality of light-emitting devices 122 face a side surface of the light guide plate 13.

Referring to FIG. 7, in some embodiments, an extension plate 113 is not provided in the rear housing 11 of the backlight module 100, and the backlight module 100 further includes a third light shielding portion 163.

The third light shielding portion 163 has a connection groove 1630. For example, as shown in FIG. 7, a section of the third light shielding portion 163 may be in a shape of "U".

The side wall 112 of the rear housing 11 is embedded in the connection groove 1630. The third light shielding portion 1630 is closer to the side wall 112 than the light source 12. An orthographic projection of the light source 12 on the side wall 112 is located within an orthographic projection of the third light shielding portion 163 on the side wall 112. In this case, the third light shielding portion 163 may be used for blocking light leaked from the light source 12 to a side of the light source 12 away from the side wall 112, thereby preventing a display effect of the display apparatus 1000 from being affected due to a light leakage of the display module 100. In addition, the extension plate 113 is not provided in the structure shown in FIG. 7, so that a bezel of the display apparatus 1000 may be set to be relatively narrow.

For example, the third light shielding portion 163 may be a light shielding adhesive 160 (e.g., a double-sided adhesive). The third light shielding portion 163 is provided as the light shielding adhesive 160, and has a certain buffering effect, which facilitates fixing of the liquid crystal display panel 200 and the light source 12.

Figure 8:
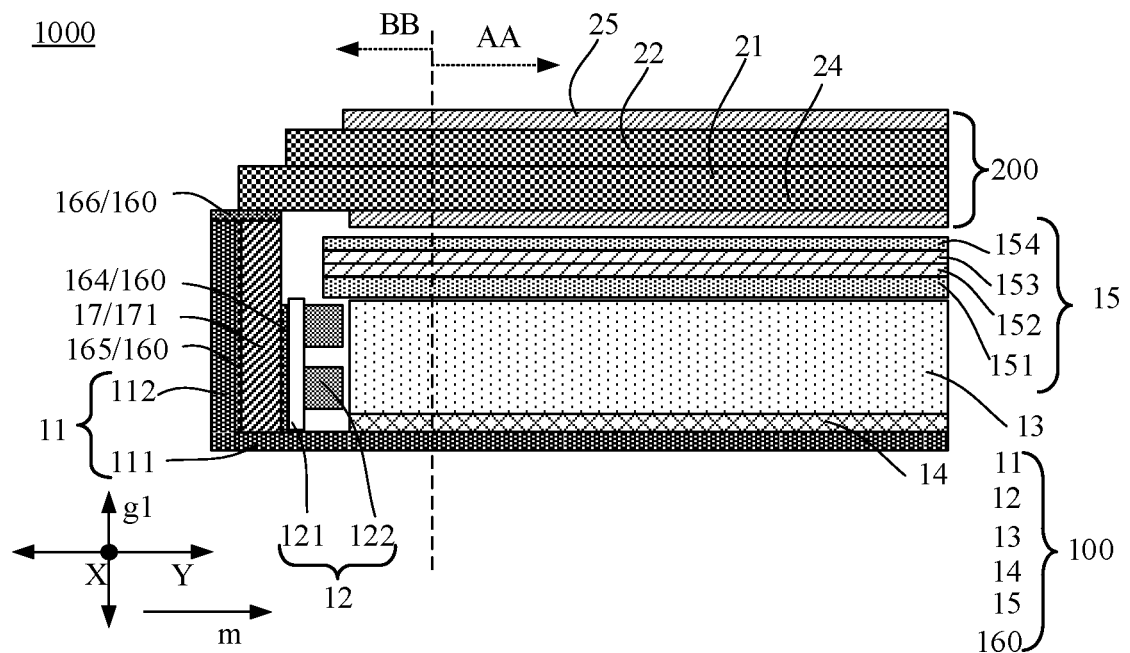
FIG. 8 is a sectional view showing a structure of another display apparatus, in accordance with yet other embodiments.
Figure 9:
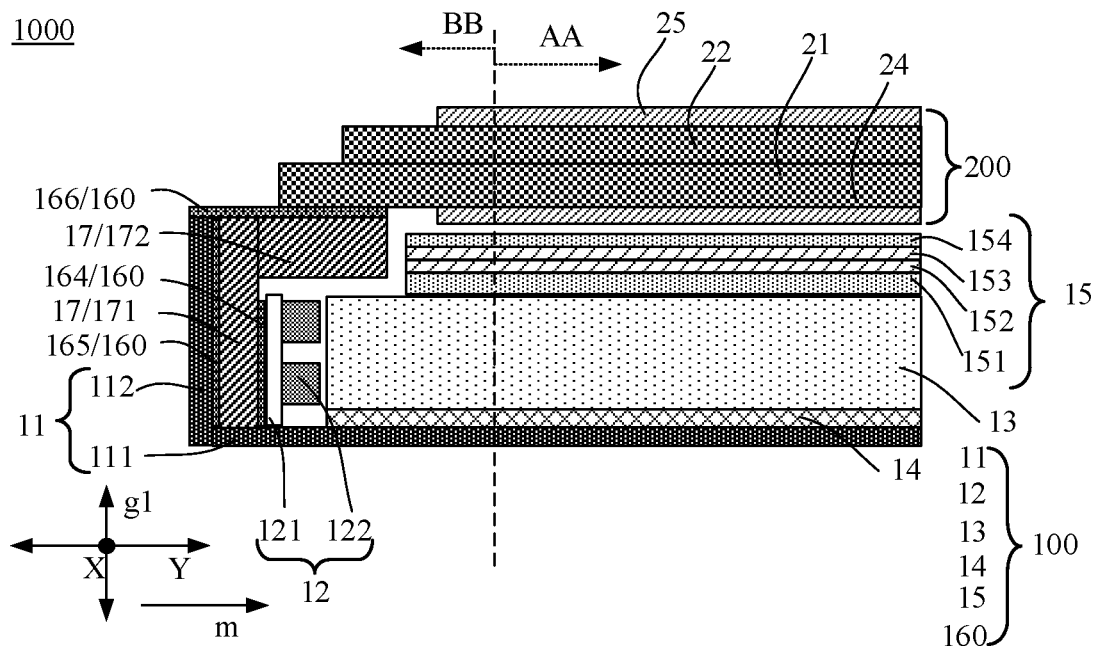
FIG. 9 is a sectional view showing a structure of yet another display apparatus, in accordance with yet other embodiments.

FIG. 8 is a sectional view showing a structure of another display apparatus, in accordance with yet other embodiments; FIG. 9 is a sectional view showing a structure of yet another display apparatus, in accordance with yet other embodiments. It will be understood that only the array substrate 21, the opposite substrate 22, the first polarizer 24 and the second polarizer 25 of the liquid crystal display panel 200 are shown in FIGS. 8 and 9 for an illustration. A backlight module 100 may include a rear housing 11, a light source 12, a light guide plate 13, a reflective sheet 14 and a light adjustment assembly 15. The light source 12 also adopts a "side-attached" manner. That is, a surface, away from a plurality of light-emitting devices 122, of a circuit board 121 of the light source 12 faces a side wall 112, and light-emitting surfaces of the plurality of light-emitting devices 122 face a side surface of the light guide plate 13.

As shown in FIGS. 8 and 9, the backlight module 100 further includes a mold frame 17, the mold frame 17 includes a first extension portion 171, and the first extension portion 171 is located between the light source 12 and the side wall 112. The mold frame 17 may be used for supporting the liquid crystal display panel 200, which has a great buffer effect and is conducive to releasing stress.

As shown in FIGS. 8 and 9, the backlight module 100 further includes a fourth light shielding portion 164 and a fifth light shielding portion 165. The fourth light shielding portion 164 is located between the light source 12 and the first extension portion 171; the fifth light shielding portion 165 is located between the first extension portion 171 and the side wall 112. In this case, the fourth light shielding portion 164 and the fifth light shielding portion 165 may be each used for blocking light leaked from the light source 12 to a side of the light source 12 proximate to the side wall 112, thereby preventing a display effect of the display apparatus 1000 from being affected due to a light leakage of the display module 100.

For example, any one of the fourth light shielding portion 164 and the fifth light shielding portion 165 may be a light shielding adhesive 160 (e.g., a double-sided adhesive). The fourth light shielding portion 164 and the fifth light shielding portion 165 are each provided as the light shielding adhesive 160, which facilitates fixing of the mold frame 17 and the light source 12.

For example, a thickness (a dimension in the second direction Y) of the first extension portion 171 may be 0.25 mm or more, and a thickness of the fifth light shielding portion 165 may be 0.03 mm or more.

In some examples, the thickness (the dimension in the second direction Y) of the first extension portion 171 is 0.3 mm or more, a wall thickness of the side wall 112 is 0.3 mm or more, and the thickness of the fifth light shielding portion 165 may be 0.05 mm or more. Thus, a total thickness (a dimension in the second direction Y) of the first extension portion 171, the side wall 112 and the fifth light shielding portion 165 may be 0.65 mm or more. In this case, since a width required for supporting the liquid crystal display panel 200 is generally 0.5 mm, and an assembly accuracy is generally 0.15 mm, it is possible to support the liquid crystal display panel 200 relatively well by setting the total thickness (the dimension in the second direction Y) of the first extension portion 171, the side wall 112 and the fifth light shielding portion 165 to be 0.65 mm or more.

In some examples, as shown in FIGS. 8 and 9, the backlight module 100 further includes a sixth light shielding portion 166, and the sixth light shielding portion 166 covers an end of the side wall 112 away from the bottom wall 111 and an end of the first extension portion 171 away from the bottom wall 111. In this way, it is conducive to avoiding light leakage at a side viewing angle, i.e., avoiding light leakage of a bezel region BB of the display apparatus 1000. The sixth light shielding portion 166 may be a light shielding adhesive 160 (e.g., a double-sided adhesive). The sixth light shielding portion 166 is provided as the light shielding adhesive 160, and has a certain buffering effect, which facilitates the fixing of the liquid crystal display panel 200.

In some other embodiments, as shown in FIG. 9, the mold frame 17 further includes a second extension portion 172, the second extension portion 172 is connected to the end of the first extension portion 171 away from the bottom wall 111, and the second extension portion 172 extends in the third direction m. In this case, a contact area between the mold frame 17 and the liquid crystal display panel 200 may be improved, so as to improve the support stability.

For example, a total thickness (a dimension in the second direction Y) of the second extension portion 172 and the first extension portion 171 may be 0.25 mm or more, and the thickness of the fifth light shielding portion 165 may be 0.03 mm or more.

In some examples, the total thickness (the dimension in the second direction Y) of the second extension portion 172 and the first extension portion 171 may be 0.3 mm or more, the wall thickness of the side wall 112 is 0.3 mm or more, and the thickness of the fifth light shielding portion 165 may be 0.05 mm or more. Thus, a total thickness (a dimension in the second direction Y) of the second extension portion 172, the first extension portion 171, the side wall 112 and the fifth light shielding portion 165 may be 0.65 mm or more. In this case, since the width required for supporting of the liquid crystal display panel 200 is generally 0.5 mm, and the assembly accuracy is generally 0.15 mm, it is possible to support the liquid crystal display panel 200 relatively well by setting the total thickness (the dimension in the second direction Y) of the second extension portion 172, the first extension portion 171, the side wall 112 and the fifth light shielding portion 165 to be 0.65 mm or more.

In a case where the mold frame 17 further includes the second extension portion 172, for example, as shown in FIG. 9, in addition to the end of the side wall 112 away from the bottom wall 111 and the end of the first extension portion 171 away from the bottom wall 111, the sixth light shielding portion 166 further covers an end of the second extension portion 172 away from the bottom wall 111. In this case, the sixth light shielding portion 166 may be used for blocking light leaked from the light source 12 to a side of the light source 12 away from the bottom wall 111, thereby preventing the display effect of the display apparatus 1000 from being affected due to the light leakage of the display module 100.

For example, the thickness of any one of the first light shielding portion 161, the second light shielding portion 162, the third light shielding portion 163, the fourth light shielding portion 164, the fifth light shielding portion 165 and the sixth light shielding portion 166 may be 0.03 mm or more.

An overall structure of both the liquid crystal display panel 200 and the backlight module 100 in the display apparatus 1000 is described above. Hereinafter, the light source 12 in the backlight module 100 will be described in detail.

Figure 10:
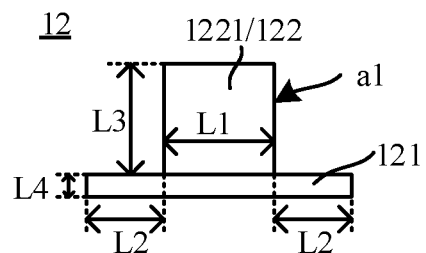
FIG. 10 is a diagram showing a structure of a light source, in accordance with some embodiments.
Figure 11:
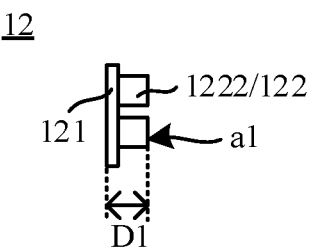
FIG. 11 is a diagram showing a structure of a light source, in accordance with some other embodiments.

FIG. 10 is a diagram showing a structure of a light source, in accordance with some embodiments; FIG. 11 is a diagram showing a structure of a light source, in accordance with some other embodiments.

In some embodiments, as shown in FIG. 10, at least one light-emitting device of the plurality of light-emitting devices 122 is an LED 1221 (i.e., an LED chip). In some examples, a width L1 of the LED 1221 may be in a range from 0.6 mm to 1.0 mm, such as 0.6 mm, 0.85 mm or 1 mm; a distance L2 between an orthographic projection of the LED 1221 on the circuit board 121 and an edge of the circuit board 121 is 0.3 mm or more; an assembly gap that needs to be provided between the circuit board and the side wall is 0.2 mm or more. Therefore, in a case where the surface, away from the plurality of light-emitting devices 122, of the circuit board 121 of the light source 12 faces the bottom wall 111, a distance between the light incident surface of the light guide plate 13 and the side wall 112 is at least 1.1 mm (0.6 mm+0.3 mm+0.2 mm). In some embodiments of the present disclosure, a height L3 of the LED 1221 is in a range from 0.5 mm to 0.6 mm, such as 0.5 mm or 0.6 mm; a thickness L4 of the circuit board 121 is in a range from 0.08 mm to 0.3 mm, inclusive. Therefore, the surface, away from the plurality of light-emitting devices 122, of the circuit board 121 of the light source 12 faces the side wall 112, which makes it possible to reduce the distance between the light incident surface of the light guide plate 13 and the side wall 112 to 0.58 mm (0.5 mm+0.08 mm), so that the width of the bezel of the display apparatus 1000 is greatly reduced.

In some other embodiments, as shown in FIG. 11, at least one light-emitting device 122 of the plurality of light-emitting devices 122 is a mini LED 1222 (i.e., a mini LED chip). In some examples, a total thickness D1 of the mini LED 1222 and the circuit board 121 is in a range from 0.3 mm to 0.5 mm, inclusive. As a result, a distance between the light guide plate and the side wall may be set to be relatively small, which is conducive to achieving the narrow bezel of the display apparatus 1000.

It will be understood that, in a case where the surface, away from the plurality of light-emitting devices 122, of the circuit board 121 of the light source 12 faces the side wall 112, and the light-emitting device 122 is the mini LED chip, it is possible to arrange more light-emitting devices 122 on the circuit board 121 and enable the light-emitting surfaces of all the light-emitting devices 122 to be all contact with the side surface of the light guide plate 13.

Figure 12:
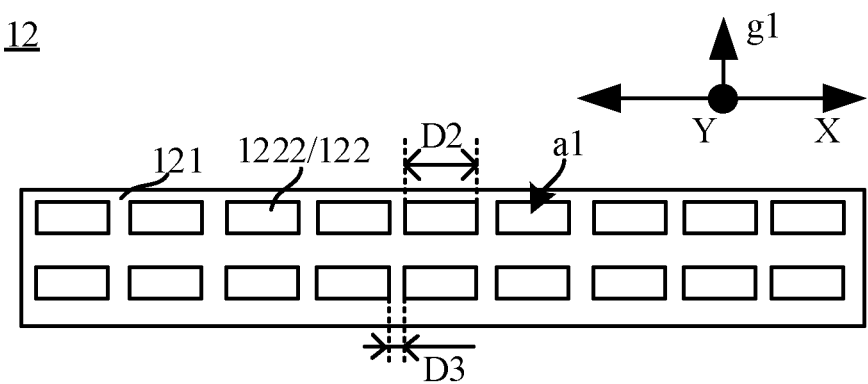
FIG. 12 is an arrangement structural diagram of a light source, in accordance with some embodiments.
Figure 13:
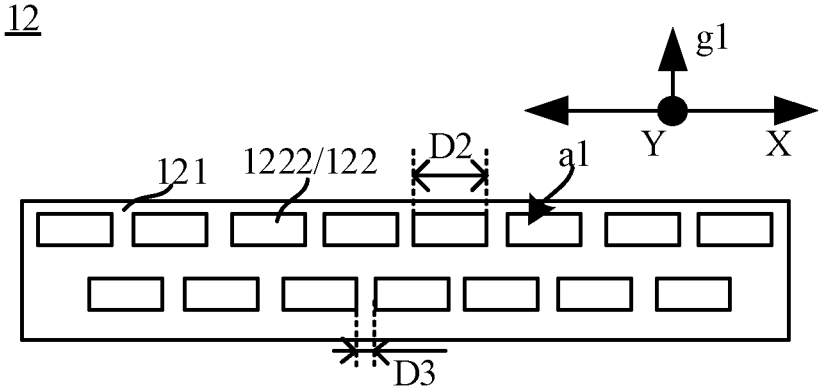
FIG. 13 is an arrangement structural diagram of another light source, in accordance with some embodiments.

FIG. 12 is an arrangement structural diagram of a light source, in accordance with some embodiments. FIG. 13 is an arrangement structural diagram of a light source, in accordance with some other embodiments.

In some embodiments, referring to FIGS. 12 and 13, the plurality of light-emitting devices 122 are arranged in at least one row in the first direction X, and the first direction X is perpendicular to the thickness direction g1 of the bottom wall 111.

In some examples, as shown in FIG. 12, the plurality of light-emitting devices 122 are arranged in at least two rows, and two adjacent rows of LEDs 1222 are aligned to each other. With this design, the structure is relatively simple, which makes it easy to connect the light-emitting devices 122 to the circuit board 121 and enable the light-emitting devices 122 to be matched with respective structures (e.g., mesh structures used for adjusting light) in the light guide plate 13, so that it is convenient for an adjustment, by using the light guide plate 13, of the light emitted by the light-emitting devices 122.

For example, the light-emitting devices 122 in FIG. 12 are each the mini LED 1222. With this design, it is possible to arrange a greater number of light-emitting devices 122 on the circuit board 121 of the same size. The light-emitting surfaces a1 of all the light-emitting devices 122 are all contact with the side surface of the light guide plate 13, so that it is conducive to improving luminance of the light source.

In some other examples, as shown in FIG. 13, the plurality of light-emitting devices 122 are arranged in at least two rows, and two adjacent rows of LEDs are staggered. With this design, in the first direction X, there is no gap among the plurality of light-emitting devices 122. As a result, a light mixing requirement for the light guide plate 13 is relatively low, which is conducive to ameliorating the hotspot phenomenon.

For example, the light-emitting devices 122 in FIG. 13 are each the mini LED 1222. With this design, it is possible to arrange a greater number of light-emitting devices 122 on the circuit board 121 of the same size. The light-emitting surfaces a1 of all the light-emitting devices 122 are all contact with the side surface of the light guide plate 13, so that it is conducive to improving the luminance of the light source.

In some examples, referring to FIGS. 12 and 13, a width D2 of a single mini LED 1222 is in a range from 0.39 mm to 0.5 mm, inclusive; a minimum distance between an orthographic projection of a mini LED 1222 on the circuit board 121 and the edge of the circuit board 121 is 0.2 mm or more; a distance D3 between two adjacent mini LEDs 1222 is 0.5 mm or more. It will be understood that the distance D3 between the two adjacent mini LEDs 1222 is affected by the welding accuracy, and the two are negative correlation with each other. That is, the higher the welding accuracy, the less the distance D3 between the two adjacent mini LEDs 1222. It is conducive to ameliorating the hotspot phenomenon by reducing the distance D3 between the two adjacent mini LEDs 1222.

Hereinafter, the light guide plate 13 in the backlight module 100 will be described in detail.

Figure 14:
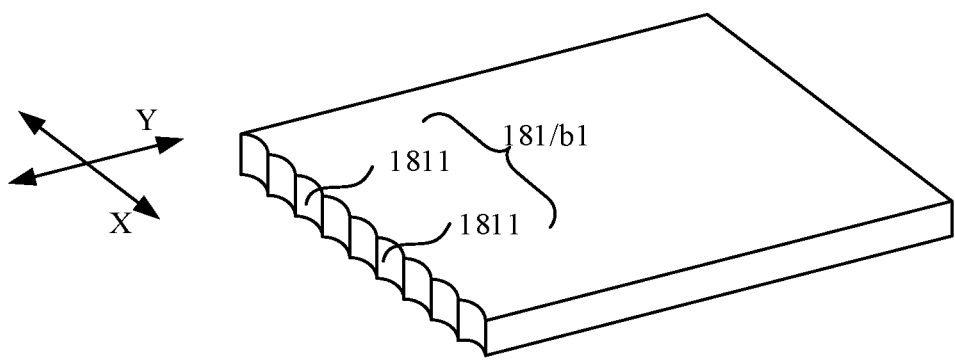
FIG. 14 is a diagram showing a structure of a light guide plate, in accordance with some embodiments.
Figure 15:
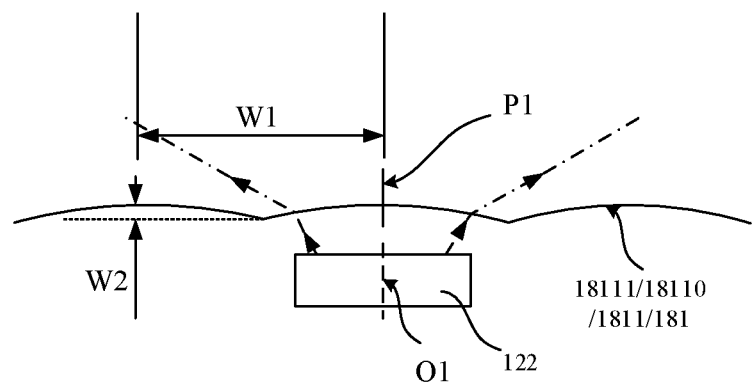
FIG. 15 is a diagram showing a light path of which light emitted by a light-emitting device is adjusted by a light incident surface of a light guide plate, in accordance with some embodiments.
Figure 16:
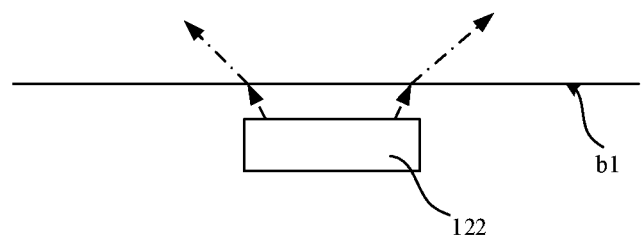
FIG. 16 is a diagram showing another light path of which light emitted by a light-emitting device is adjusted by a light incident surface of a light guide plate, in accordance with some embodiments.
Figure 17:
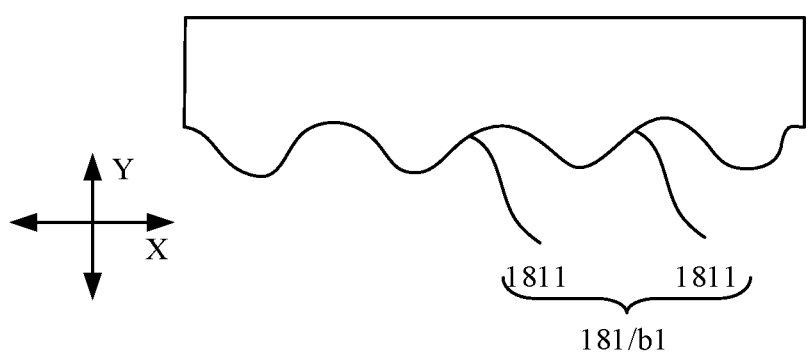
FIG. 17 is a diagram showing a structure of a first light adjustment structure of a light guide plate, in accordance with some embodiments.
Figure 18:
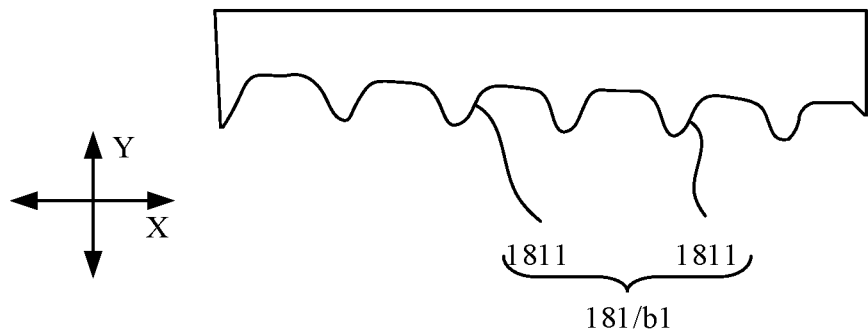
FIG. 18 is a diagram showing a structure of another first light adjustment structure of a light guide plate, in accordance with some embodiments.

FIG. 14 is a diagram showing a structure of a light guide plate, in accordance with some embodiments. FIG. 15 is a diagram showing a light path of which light emitted by a light-emitting device is adjusted by a light incident surface of the light guide plate, in accordance with some embodiments; FIG. 16 is a diagram showing a light path of which light emitted by a light-emitting device is adjusted by a light incident surface of another light guide plate, in accordance with some embodiments. FIG. 17 is a diagram showing a structure of a first light adjustment structure of the light guide plate, in accordance with some embodiments; FIG. 18 is a diagram showing a structure of another first light adjustment structure of the light guide plate, in accordance with some embodiments.

In some embodiments, as shown in FIG. 14, at least a part of the side surfaces of the light guide plate 13 is the light incident surface b1. The light incident surface b1 faces a light-emitting surface a1 of a light-emitting device 122. For example, as shown in FIG. 14, the light guide plate 13 has a plurality of side surfaces (e.g., four side surfaces), and one of the side surfaces is the light incident surface b1.

The light incident surface b1 has a first light adjustment structure 181, and the first light adjustment structure 181 is configured to disperse the light emitted by the plurality of light-emitting devices 122. With this design, it is conducive to improving a light mixing effect of the light guide plate, which enables the light emitted by the plurality of light-emitting devices 122 to be mixed relatively well after entering into the light guide plate, so that the hotspot phenomenon is not prone to occur in the display apparatus 1000.

In some examples, as shown in FIGS. 14, 17 and 18, the first light adjustment structure 181 includes a plurality of first adjustment portions 1811 arranged in the first direction X. The first direction X is perpendicular to the thickness direction of the bottom wall 111.

As shown in FIG. 15, a light-emitting surface a1 of a light-emitting device 122 of the plurality of light-emitting devices 122 faces a first adjustment portion 1811 of the plurality of first adjustment portions 1811. In this case, the first adjustment portion 1811 may be used to disperse the light emitted by the light-emitting device 122, thereby improving the light mixing effect of the light guide plate 13 and shortening the light mixing distance of the light guide plate 13. As a result, the bezel of the display apparatus to which the light guide plate is applied may be set to be relatively narrow.

On this basis, for example, as shown in FIG. 15, a distance W1 between centers of two adjacent first adjustment portions 1811 is in a range from 50 μm to 120 μm, inclusive. For example, the distance W1 between the centers of the two adjacent first adjustment portions may be in any one of a range from 50 μm to 70 μm, inclusive, a range from 70 μm to 90 μm, inclusive, and a range from 90 μm to 120 μm, inclusive. For another example, the distance W1 between the centers of the two adjacent first adjustment portions may be any one of 50 μm, 85 μm, 100 μm, 110 μm and 120 μm.

In these examples, the distance W1 between the centers of the two adjacent first adjustment portions is set to be in the range from 50 μm to 120 μm, inclusive, so that the distance between the centers of the two adjacent first adjustment portions is relatively large, and a dispersing and mixing effect on the light is relatively good. Moreover, the distance W1 between the centers of the two adjacent first adjustment portions may be set to be in any one of the range from 50 μm to 70 μm, inclusive, the range from 70 μm to 90 μm, inclusive, and the range from 90 μm to 120 μm, inclusive; alternatively, the distance W1 between the centers of the two adjacent first adjustment portions may be any one of 50 μm, 85 μm, 100 μm, 110 μm and 120 μm. In this way, the first light adjustment structure 181 matches positions of the plurality of light-emitting devices in the light source 12 relatively well, so that the light emitted by all the light-emitting devices may be dispersed adequately. As a result, the light mixing effect of the light guide plate 13 is improved, the light mixing distance of the light guide plate 13 is shortened, so that the bezel of the display apparatus to which the light guide plate is applied may be set to be relatively narrow.

In some embodiments, as shown in FIG. 15, the first adjustment portion 1811 is a concave surface 18110 of which a middle is deep and two sides are shallow. A center line O1 of the light-emitting device 122 is located or substantially located in a plane P1 of symmetry of the concave surface 18110. In this case, it is conducive to further improving the dispersing effect on the light emitted by the light-emitting devices 122, and thus it is conducive to further improving the light mixing effect of the light guide plate 13. As a result, the light mixing distance of the light guide plate 13 is shortened, so that the bezel of the display apparatus 1000 to which the light guide plate 13 is applied may be set to be relatively narrow.

In some examples, as shown in FIG. 15, the concave surface 18110 includes a cambered surface 18111.

It can be seen with reference to FIGS. 15 and 16 that a divergence angle of light in a case where the concave surface 18110 includes the cambered surface 18111 (as shown in FIG. 15) is greater than a divergence angle of light in a case where the light incident surface b1 is a plane (as shown in FIG. 16). Therefore, in the case where the concave surface 18110 includes the cambered surface, it is conducive to further improving the light mixing effect of the light guide plate 13. As a result, the light mixing distance of the light guide plate 13 is shortened, so that the bezel of the display apparatus 1000 to which the light guide plate 13 is applied may be set to be relatively narrow.

Figure 29:
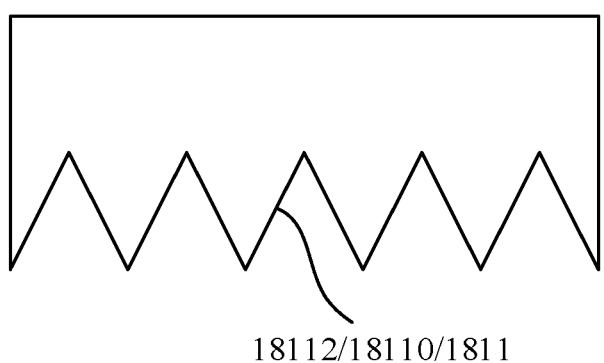
FIG. 29 is a diagram showing a structure of yet another first light adjustment structure of a light guide plate, in accordance with some embodiments.

In some other examples, as shown in FIG. 29, the concave surface 18110 includes a surface 18112 in a shape of "V". That is, the concave surface 18110 may include two planes arranged in a shape of "V". For example, an included angle between the two planes is an obtuse angle.

For example, referring to FIG. 15, a depth W2 of the concave surface 18110 is in a range from 25 μm to 40 μm, inclusive. For example, the depth W2 of the concave surface 18110 may be in any one of a range from 25 μm to 30 μm, inclusive, a range from 30 μm to 35 μm, inclusive, and a range from 35 μm to 40 μm, inclusive. For another example, the depth W2 of the concave surface 18110 may be any one of 25 μm, 27 μm, 31 μm, 33 μm, 35 μm, 37 μm and 40 μm.

In these examples, the depth W2 of the concave surface 18110 is set to be in the range from 25 μm to 40 μm, inclusive, so that depths of the two adjacent first adjustment portions 1811 are both relatively large, and the dispersing and mixing effect on the light is relatively good. Moreover, the depth W2 of the concave surface 18110 may be set to be in any one of the range from 25 μm to 30 μm, inclusive, the range from 30 μm to 35 μm, inclusive, and the range from 35 μm to 40 μm, inclusive; alternatively, the depth W2 of the concave surface 18110 may be any one of 25 μm, 27 μm, 31 μm, 33 μm, 35 μm, 37 μm and 40 μm. In this way, the first light adjustment structure 181 matches the positions of the plurality of light-emitting devices 122 in the light source 12 relatively well, so that a distance between each light-emitting device 122 and the respective light incident surface b1 is relatively small. That is, the light emitted by all the light-emitting devices may be dispersed adequately. As a result, the light mixing effect of the light guide plate 13 is improved, the light mixing distance of the light guide plate 13 is shortened, so that the bezel of the display apparatus 1000 to which the light guide plate 13 is applied may be set to be relatively narrow.

It will be noted that the first light adjustment structure 181 in the light incident surface b1 of the light guide plate 13 includes the plurality of first adjustment portions 1811. The plurality of first adjustment portions 1811 may be each of a structure having a regular and same shape as shown in FIGS. 14 and 15; alternatively, the plurality of first adjustment portions 1811 may be each of a structure, as shown in FIGS. 17 and 18, substantially having the above shape (e.g., the cambered surface). Shapes of the plurality of first adjustment portions 1811 may be just approximately the same, but not identical.

Figure 19:
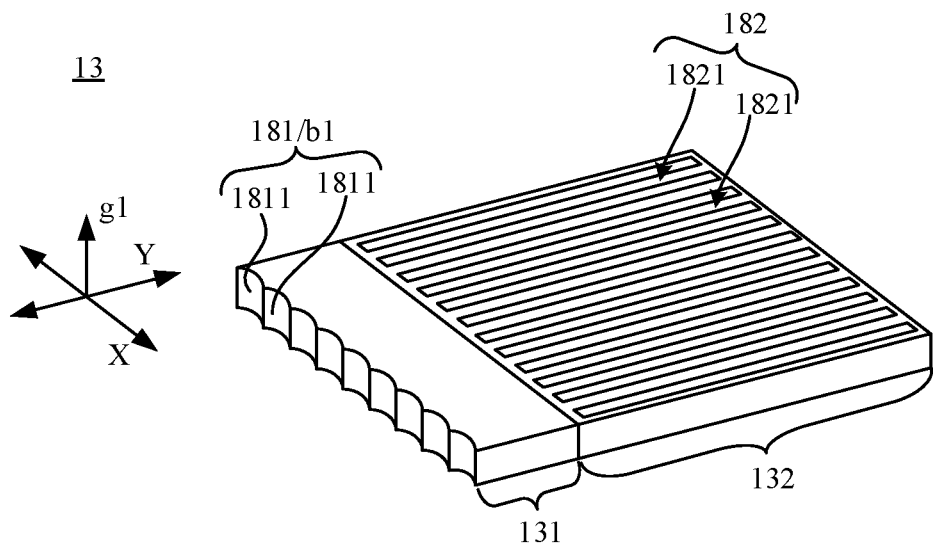
FIG. 19 is a diagram showing a structure of a light guide plate, in accordance with some other embodiments.
Figure 20:
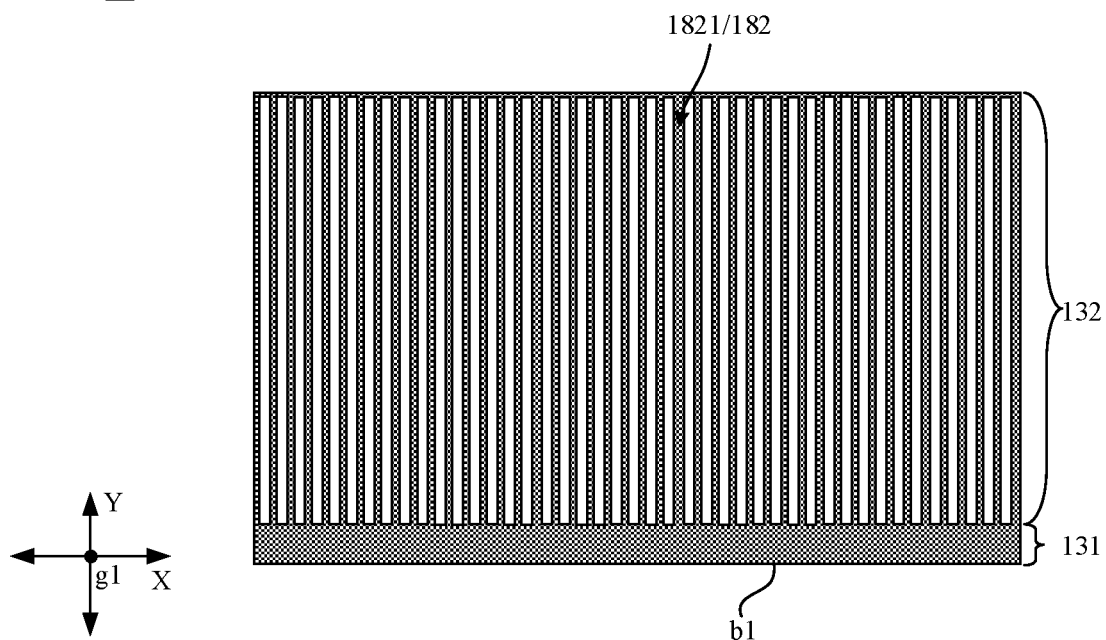
FIG. 20 is a diagram showing a structure of a light guide plate, in accordance with yet other embodiments.
Figure 21:
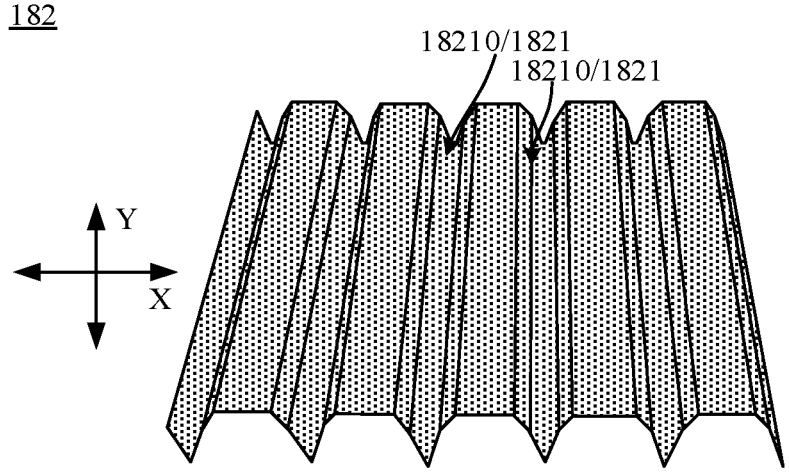
FIG. 21 is a diagram showing a structure of a second light adjustment structure, in accordance with some embodiments.
Figure 22:
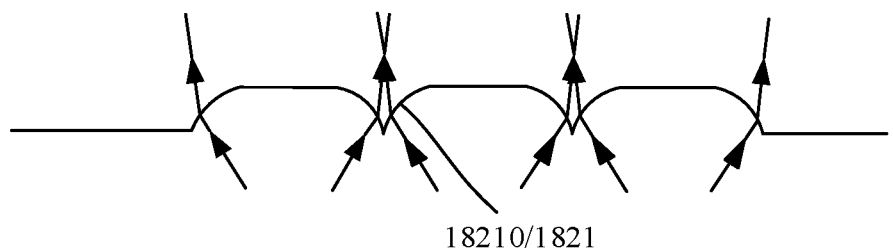
FIG. 22 is a diagram showing a light path of a second light adjustment structure, in accordance with some embodiments.
Figure 23:
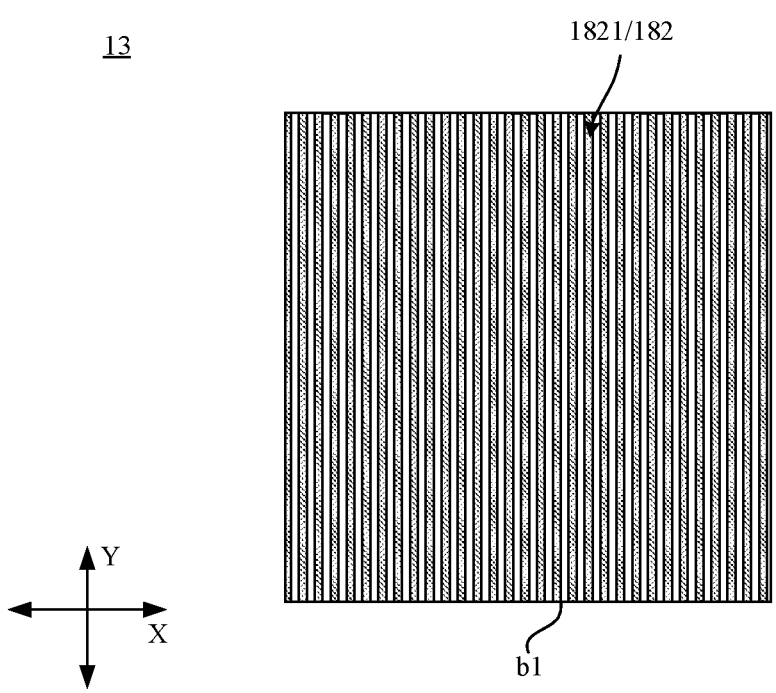
FIG. 23 is a diagram showing a structure of a light guide plate, in accordance with yet other embodiments.

FIG. 19 is a diagram showing a structure of a light guide plate, in accordance with some other embodiments; FIG. 20 is a diagram showing a structure of a light guide plate, in accordance with yet other embodiments. FIG. 21 is a diagram showing a structure of a second light adjustment structure, in accordance with some embodiments; FIG. 22 is a diagram showing a light path of the second light adjustment structure, in accordance with some other embodiments. FIG. 23 is a diagram showing a structure of a light guide plate, in accordance with yet other embodiments.

In some embodiments, as shown in FIGS. 19 and 20, the light guide plate 13 includes a first plate 131 and a second plate 132 that are connected to each other, and the first plate 131 is located between the second plate 132 and the light source 12.

For example, as shown in FIGS. 19 and 20, a side surface of the first plate 131 away from the second plate 132 is the light incident surface b1. Thus, the first light adjustment structure 181 may be located in the side surface of the first plate 131 away from the second plate 132.

In some embodiments, referring to FIGS. 19 and 20, a surface of the second plate 132 away from the bottom wall 111 has a second light adjustment structure 182.

The second light adjustment structure 182 includes a plurality of second adjustment portions 1821, and the plurality of second adjustment portions 1821 are arranged in the first direction X and each extend in the second direction Y. The first direction X and the second direction Y intersect (e.g., being perpendicular to each other) and are each perpendicular to the thickness direction g1 of the bottom wall 111.

For example, a second adjustment portion 1821 is of a convex structure or a concave structure. For example, as shown in FIGS. 21 and 22, the second adjustment portion 1821 is of the concave structure 18210, and the concave structure 18210 may be substantially in a shape of "V". The concave structure 18210 may be composed of two side surfaces, and any one of the two side surfaces may be a plane or a cambered surface. Moreover, in a case where the any one of the two side surfaces is the cambered surface, an arc center of the cambered surface is away from the other side surface.

In these embodiments, it can be seen with reference to the light path diagram shown in FIG. 22 that, by providing the plurality of second adjustment portions 1821, light emitted from the second adjustment portions 1821 may be gathered, which improves collimation of light emitted from the light guide plate 13. As a result, it is conducive to improving the brightness of the light guide plate 13.

For example, the second light adjustment structure 182 may be formed by a hot pressing or injection molding process.

It will be noted that, if the second light adjustment structure 182 is manufactured in all of a surface of the light guide plate 13 away from the bottom wall 111, the first light adjustment structure 181 cannot be manufactured in the light incident surface of the light guide plate 13. Therefore, in some of the above embodiments, the light guide plate 13 is divided into the first plate 131 and the second plate 132, and the second light adjustment structure 182 is not manufactured in the first plate 131, but is manufactured in the second plate 132, so that the first light adjustment structure 181 may be manufactured in the side surface (i.e., the light incident surface b1) of the first plate 131 away from the second plate 132. In addition, the surface of the second plate 132 away from the bottom wall 111 has the second light adjustment structure 182, which may enable the light emitted from the second adjustment portions 1821 to be gathered, so that the collimation of the light emitted from the light guide plate 13 is improved. As a result, it is conducive to improving the luminance of the light guide plate 13.

For example, the second plate 132 covers the entire display region AA of the display apparatus 1000. In this case, it is conducive to improving the brightness of the displayed image of the display apparatus 1000, and the brightness at each position is relatively uniform.

For another example, the second plate 132 may extend beyond the display region AA on a basis of covering the entire display region AA of the display apparatus 1000. That is, the second plate 132 may further cover a portion of the bezel region BB, such as a portion of the bezel region BB (e.g., a bezel near a keyboard shown in FIG. 1) where the light source 12 is located. In this case, it is conducive to preventing a dark region from being produced at an edge of the displayed image of the display apparatus 1000.

For example, in the second direction Y, a dimension of the first plate 131 is in a range from 0.3 mm to 0.5 mm, inclusive. In this case, it is conducive to not only manufacturing the first light adjustment structure 181 in the light guide plate 13, but also manufacturing the second light adjustment structure in the light guide plate 13, and it is possible to ensure light adjustment performance of the first light adjustment structure 181 and the second light adjustment structure 182. Thus, the display brightness and the display uniformity are both improved.

In some other embodiments, as shown in FIG. 23, the second light adjustment structure 182 may be disposed in the entire surface of the light guide plate 13 away from the bottom wall 111. That is, the second light adjustment structure 182 is disposed in surfaces of both the first plate 131 and the second plate 132 away from the bottom wall 111. It will be noted that, in this case, the first light adjustment structure 181 is not provided in the light incident surface of the light guide plate 13.

Figure 24:
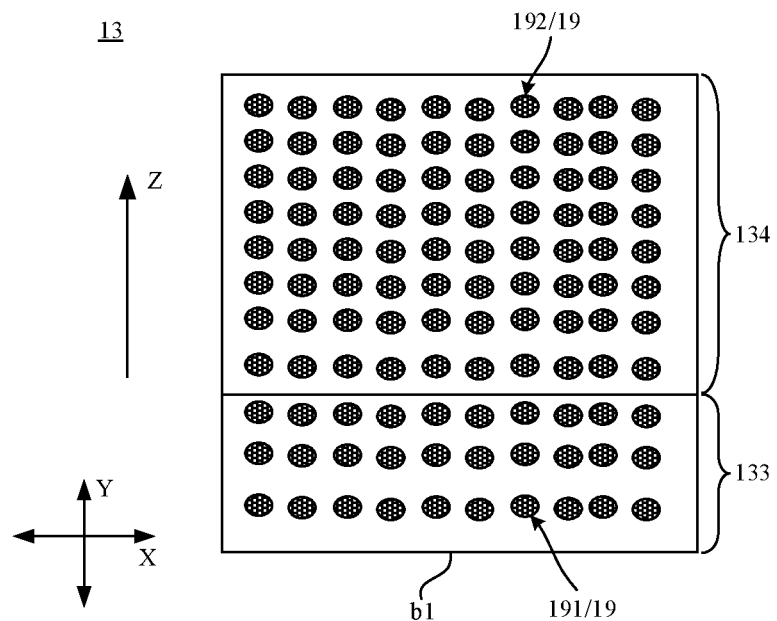
FIG. 24 is a diagram showing a structure of a light guide plate, in accordance with yet other embodiments.
Figure 25:
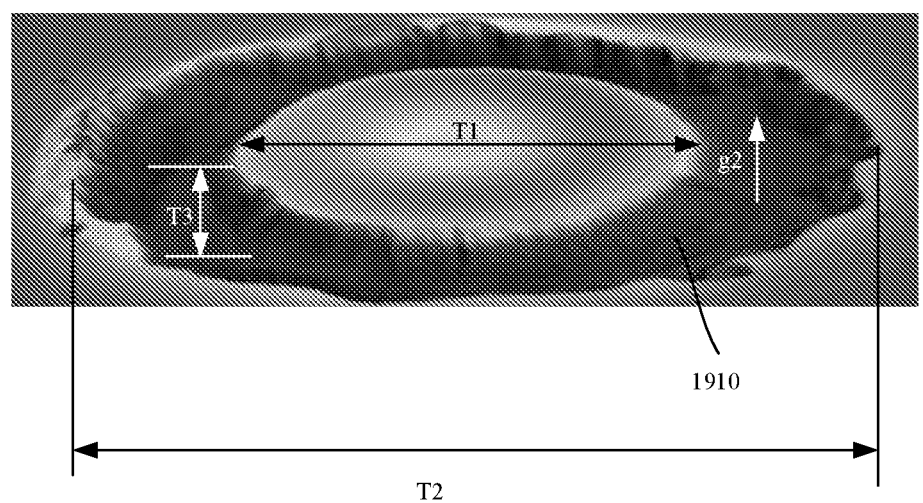
FIG. 25 is a diagram showing a structure of a first mesh structure, in accordance with some embodiments.
Figure 26:
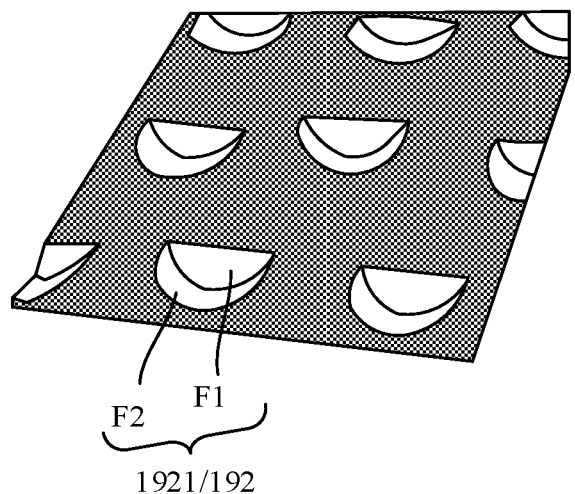
FIG. 26 is a diagram showing structures of second mesh structures, in accordance with some embodiments.
Figure 27:
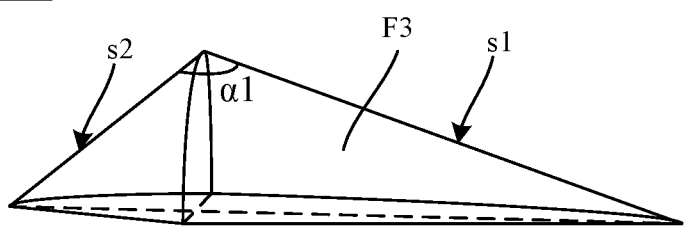
FIG. 27 is a diagram showing a structure of a second mesh structure, in accordance with some other embodiments.
Figure 28:
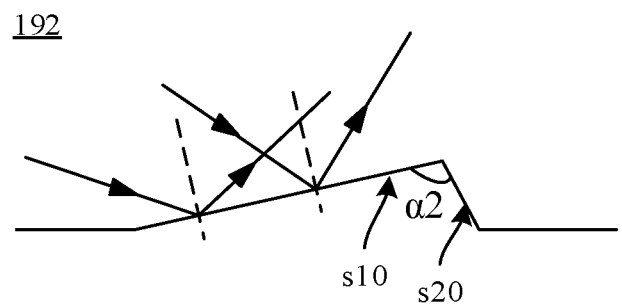
FIG. 28 is a diagram showing a light path of a second mesh structure, in accordance with some embodiments.

FIG. 24 is a diagram showing a structure of a light guide plate, in accordance with yet other embodiments. FIG. 25 is a diagram showing a structure of a first mesh structure, in accordance with some embodiments; FIG. 26 is a diagram showing structures of second mesh structures, in accordance with some embodiments; FIG. 27 is a diagram showing a structure of a second mesh structure, in accordance with some other embodiments; FIG. 28 is a diagram showing a light path of a second mesh structure, in accordance with some embodiments.

In some embodiments, referring to FIG. 24, a surface of the light guide plate 13 proximate to the bottom wall 111 has a plurality of mesh structures 19, and the plurality of mesh structures 19 may be the same or different. In these embodiments, the plurality of mesh structures 19 are disposed in the surface of the light guide plate 13 proximate to the bottom wall 111. Thus, the light may be reflected and scattered by the mesh structures 19, which improves the light mixing effect, and is conducive to improving the brightness of the backlight module.

In some embodiments, as shown in FIG. 24, the light guide plate 13 includes a third plate 133 and a fourth plate 134 that are connected to each other, and the third plate 133 is located between the fourth plate 134 and the light source 12.

It will be noted that an interface (referred to as a first interface) between the third plate 133 and the fourth plate 134 may or may not coincide with an interface (referred to as a second interface) between the first plate 131 and the second plate 132. In a case where the first interface does not coincide with the second interface, for example, the first interface may be located outside the display region AA, and the second interface may be located within the display region AA.

In some embodiments, referring to FIG. 24, a surface of the third plate 133 proximate to the bottom wall 111 has a plurality of first mesh structures 191; a surface of the fourth plate 134 proximate to the bottom wall 111 has a plurality of second mesh structures 192.

A light mixing capability of the plurality of first mesh structures 191 is stronger than a light mixing capability of the plurality of second mesh structures 192, and a light collimation capability of the plurality of second mesh structures 192 is stronger than a light collimation capability of the plurality of first mesh structures 191.

It will be noted that, the light mixing capability is strong, which refers to that light after being adjusted by the respective mesh structures is dispersive and may be greatly deviated from a reference axis (e.g., an axis parallel to the thickness direction g1 of the bottom wall 111 of the rear housing 11); the collimation capability is strong, which refers to that light after being adjusted by the respective mesh structures is gathered (e.g., being proximate to a reference axis, such as an axis parallel to the thickness direction g1 of the bottom wall 111 of the rear housing 11). It will be understood that, as for any mesh structure, the stronger a light mixing capability, the weaker a collimation capability accordingly.

In these embodiments, the third plate 133 is proximate to the light source 12, and the first mesh structures 191 having the strong light mixing capability and the weak collimation capability are disposed in the surface of the third plate 133 proximate to the bottom wall 111, which is conducive to improving the light mixing effect on the light incident surface and ameliorating the hotspot phenomenon. In addition, the fourth plate 134 is away from the light source 12, and the second mesh structures 192 having the strong collimation capability and the weak light mixing capability are disposed in the surface of the fourth plate 134 proximate to the bottom wall 111, which is conducive to improving collimation of light emitted therefrom. As a result, it is conducive to improving the brightness.

In some embodiments, referring to FIG. 24, in a direction Z from the third plate 133 to the fourth plate 134, an arrangement density of the plurality of first mesh structures 191 gradually increases, and an arrangement density of the plurality of second mesh structures 192 gradually increases. The light emitted by the light source 12 enters the light guide plate 13 through a surface of the third plate 133 away from the fourth plate 134, and the light is gradually attenuated after entering the light guide plate 13. In these embodiments, in the direction from the third plate 133 to the fourth plate 134, the arrangement density of the plurality of first mesh structures 191 gradually increases, and the arrangement density of the plurality of second mesh structures 192 gradually increases, so that the incident light may be adjusted. Thus, in the direction from the third plate 133 to the fourth plate 134, the brightness of the light guide plate 13 is relatively uniform, which is conducive to improving the image quality of the display apparatus 1000. It will be understood that the greater the density of the mesh structures, the higher the brightness.

In some embodiments, as shown in FIG. 25, at least one first mesh structure 191 of the plurality of first mesh structures 191 is an annular pit 1910.

In these embodiments, a firing pin having an annular surface may be used for impacting the surface of the light guide plate 13 proximate to the bottom wall 111 of the rear housing 11, so as to form the annular pit 1910 as shown in FIG. 25 in the surface of the light guide plate 13 proximate to the bottom wall 111. In this case, after the light emitted by the light source 12 is incident on a wall surface of the annular pit 1910, light reflected by the wall surface of the annular pit 1910 is deviated from the reference axis (e.g., the axis parallel to the thickness direction g1 of the bottom wall 111 of the rear housing 11) at a relatively large angle, so that the light mixing capability is relatively strong.

On this basis, for example, as shown in FIG. 25, in a direction g2 from a bottom to an opening of the annular pit 1910, an inner diameter T1 of the annular pit 1910 gradually decreases, and/or an outer diameter T2 of the annular pit 1910 gradually increases. With this arrangement, it is conducive to further enabling the light reflected by the wall surface of the closed annular pit 1910 to be deviated from the reference axis (e.g., the axis parallel to the thickness direction g1 of the bottom wall 111 of the rear housing 11). Thus, it is conducive to improving the light mixing capability.

For example, as shown in FIG. 25, a depth T3 of the annular pit 1910 is in a range from 2 µm to 4 µm, inclusive, and a maximum width of the outer diameter T2 of the annular pit 1910 is in a range from 40 µm to 60 µm, inclusive. With this arrangement, the angle at which the light reflected by the wall surface of the closed annular pit 1910 is deviated from the reference axis (e.g. the axis parallel to the thickness direction g1 of the bottom wall 111 of the rear housing 11) is not prone to be too small, which is conducive to improving the light mixing capability.

In some embodiments, as shown in FIG. 26, at least one second mesh structure 192 of the plurality of second mesh structures 192 includes a first tapered pit 1921 defined by a plane F1 and a curved surface F2.

In these embodiments, the curved surface F2 may be used for reflecting light in the light guide plate 13, and light after being reflected by the curved surface F2 may be relatively proximate to the reference axis (e.g. the axis parallel to the thickness direction g1 of the bottom wall 111 of the rear housing 11) due to a relatively large tilt of the curved surface F2. As a result, it is conducive to improving the light collimation, so that the brightness is improved.

In some other embodiments, as shown in FIG. 27, at least one second mesh structure 192 of the plurality of second mesh structures 192 includes a second tapered pit 1922 defined by at least three planes F3 (e.g., four planes F3 as shown in FIG. 27). The second tapered pit 1922 includes a first edge s1 and a second edge s2, a length of the first edge s1 is greater than a length of the second edge s2, and an included angle α1 between the first edge s1 and the second edge s2 is an obtuse angle.

In these embodiments, the length of the first edge s1 is greater than the length of the second edge s2, and the included angle α1 between the first edge s1 and the second edge s2 is the obtuse angle. In this way, the second tapered pit 1922 has a wall surface with a relatively large tilt, so that the light after being reflected by the wall surface is relatively proximate to the reference axis (e.g. the axis parallel to the thickness direction g1 of the bottom wall 111 of the rear housing 11). As a result, it is conducive to improving the light collimation, so that the brightness is improved.

In some examples, a section, taken along a thickness direction of the light guide plate 13, of at least one second mesh structure 192 of the plurality of second mesh structures 192 is substantially in a shape of an obtuse triangle. Referring to FIG. 28, in this case, an included angle α2 between two edges S10 and S20 of the section is an obtuse angle. That is, the second mesh structure 192 has a wall surface with a relatively large tilt. Thus, light after being reflected by the wall surface is relatively proximate to the reference axis (e.g. the axis parallel to the thickness direction g1 of the bottom wall 111 of the rear housing 11). As a result, it is conducive to improving the light collimation, so that the luminance is improved.

In summary, the embodiments of the present disclosure provide the backlight module 100 and the display apparatus 1000, by optimizing the structure of the backlight module 100 such as the arrangement of the light source 12, the structure of the light source 12 and the structure of the light guide plate 13, in the case where the backlight module 100 is applied to the display apparatus 1000 (as shown in FIG. 6), the bezel region BB of the display apparatus 1000 may be relatively narrow, so that the screen-to-body ratio (i.e., the ratio of the area of the display surface of the display apparatus 1000 to the area of the front surface thereof) is improved; in addition, it is conducive to improving the quality of the displayed image (e.g., ameliorating the hotspot phenomenon and improving the brightness).

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight module, comprising:
a rear housing including a bottom wall and a side wall that are connected to each other; the bottom wall and the side wall defining an accommodation cavity;
a light guide plate located in the accommodation cavity;
a light source located in the accommodation cavity and located between the side wall and a side surface of the light guide plate; wherein the light source includes a circuit board and a plurality of light-emitting devices that are mounted on the circuit board, a surface of the circuit board away from the plurality of light-emitting devices faces the side wall, and light-emitting surfaces of the plurality of light-emitting devices face the side surface of the light guide plate;
a mold frame including a first extension portion located between the light source and the side wall;
a fourth light shielding portion located between the light source and the first extension portion; and
a fifth light shielding portion located between the first extension portion and the side wall.

2. The backlight module according to claim 1, wherein the plurality of light-emitting devices are arranged in at least one row in a first direction, and the first direction is perpendicular to a thickness direction of the bottom wall.

3. The backlight module according to claim 2, wherein the plurality of light-emitting devices are arranged in at least two rows, and two adjacent rows of light-emitting devices are aligned with each other.

4. The backlight module according to claim 2, wherein the plurality of light-emitting devices are arranged in at least two rows, and two adjacent rows of light-emitting devices are staggered.

5. The backlight module according to claim 1, wherein at least one light-emitting device of the plurality of light-emitting devices is a mini light-emitting diode.

6. The backlight module according to claim 1, wherein the light guide plate includes side surfaces; at least a part of the side surfaces of the light guide plate is a light incident surface, and the light incident surface faces the light-emitting surfaces of the light-emitting devices; the light incident surface has a first light adjustment structure, and the first light adjustment structure is configured to disperse light emitted by the plurality of light-emitting devices.

7. The backlight module according to claim 6, wherein the first light adjustment structure includes a plurality of first adjustment portions arranged in a first direction, and the first direction is perpendicular to a thickness direction of the bottom wall;

a light-emitting surface of a light-emitting device of the plurality of light-emitting devices faces a first adjustment portion of the plurality of first adjustment portions.

8. The backlight module according to claim 7, wherein a distance between centers of two adjacent first adjustment portions is in a range from 25 um to 40 μm, inclusive.

9. The backlight module according to claim 7, wherein the first adjustment portion is a concave surface of which a middle is deep and two sides are shallow; a center line of the light-emitting device is located or substantially located in a plane of symmetry of the concave surface.

10. The backlight module according to claim 9, wherein the concave surface includes a cambered surface or a surface in a shape of "V"; and/or
a depth of the concave surface is in a range from 50 μm to 120 μm, inclusive.

11. The backlight module according to claim 1, wherein the light guide plate includes a first plate and a second plate that are connected to each other, and the first plate is located between the second plate and the light source;
a surface of the second plate away from the bottom wall has a second light adjustment structure, the second light adjustment structure includes a plurality of second adjustment portions, and the plurality of second adjustment portions are arranged in a first direction and each extend in a second direction;
the first direction and the second direction intersect and are each perpendicular to a thickness direction of the bottom wall.

12. The backlight module according to claim 1, wherein the light guide plate includes a third plate and a fourth plate that are connected to each other, and the third plate is located between the fourth plate and the light source;
a surface of the third plate proximate to the bottom wall has a plurality of first mesh structures;
a surface of the fourth plate proximate to the bottom wall has a plurality of second mesh structures;
a light mixing capability of the plurality of first mesh structures is stronger than a light mixing capability of the plurality of second mesh structures, and a light collimation capability of the plurality of second mesh structures is stronger than a light collimation capability of the plurality of first mesh structures.

13. The backlight module according to claim 12, wherein the plurality of first mesh structures and the plurality of second mesh structures are arranged in at least one of following manners:
at least one first mesh structure of the plurality of first mesh structures is an annular pit; or
at least one first mesh structure of the plurality of first mesh structures is an annular pit; in a direction from a bottom to an opening of the annular pit, an inner diameter of the annular pit gradually decreases, and/or an outer diameter of the annular pit gradually increases; or
at least one first mesh structure of the plurality of first mesh structures is an annular pit, a depth of the annular pit is in a range from 2 μm to 4 μm, inclusive, and a maximum width of an outer diameter of the annular pit is in a range from 40 μm to 60 μm, inclusive; or
at least one second mesh structure of the plurality of second mesh structures includes a first tapered pit defined by a plane and a curved surface; or
at least one second mesh structure of the plurality of second mesh structures includes a second tapered pit defined by at least three planes; the second tapered pit includes a first edge and a second edge, a length of the first edge is greater than a length of the second edge, and an included angle between the first edge and the second edge is an obtuse angle; or
a section, taken along a thickness direction of the light guide plate, of at least one second mesh structure of the plurality of second mesh structures is substantially in a shape of an obtuse triangle; or
in a direction from the third plate to the fourth plate, an arrangement density of the plurality of first mesh structures gradually increases, and an arrangement density of the plurality of second mesh structures gradually increases.

14. The backlight module according to claim 1, further comprising:
a sixth light shielding portion covering an end of the side wall away from the bottom wall and an end of the first extension portion away from the bottom wall.

15. The backlight module according to claim 1, wherein the mold frame further includes a second extension portion, the second extension portion is connected to an end of the first extension portion away from the bottom wall, and the second extending portion extends in a third direction; the third direction is from the side wall to the accommodation cavity;
the backlight module further comprises a sixth light shielding portion, wherein the sixth light shielding portion covers an end of the side wall away from the bottom wall, the end of the first extension portion away from the bottom wall and an end of the second extension portion away from the bottom wall.

16. The backlight module according to claim 1, further comprising:
a reflective sheet located between the light guide plate and the bottom wall; and/or
a light adjustment assembly located on a light exit side of the light guide plate.

17. A display apparatus, comprising the backlight module according to claim 1, and a liquid crystal display panel located on a light exit side of the backlight module.

18. A backlight module comprising:
a rear housing including a bottom wall and a side wall that are connected to each other; the bottom wall and the side wall defining an accommodation cavity; the rear housing further including an extension plate connected to an end of the side wall away from the bottom wall, and the extension plate extends extending in a third direction; the third direction being from the side wall to the accommodation cavity;
a light guide plate located in the accommodation cavity;
a light source located in the accommodation cavity and located between the side wall and a side surface of the light guide plate; wherein the light source includes a circuit board and a plurality of light-emitting devices that are mounted on the circuit board, a surface of the circuit board away from the plurality of light-emitting devices faces the side wall, and light-emitting surfaces of the plurality of light-emitting devices face the side surface of the light guide plate;
a first light shielding portion located on a side of the extension plate away from the bottom wall; the first light shielding portion covering the light source; and
a second light shielding portion located between the light source and the side wall.

19. A backlight module comprising:
a rear housing including a bottom wall and a side wall that are connected to each other; the bottom wall and the side wall defining an accommodation cavity;
a light guide plate located in the accommodation cavity;
a light source located in the accommodation cavity and located between the side wall and a side surface of the light guide plate; wherein the light source includes a circuit board and a plurality of light-emitting devices that are mounted on the circuit board, a surface of the circuit board away from the plurality of light-emitting devices faces the side wall, and light-emitting surfaces of the plurality of light-emitting devices face the side surface of the light guide plate; and
a third light shielding portion having a connection groove;
wherein the side wall is embedded in the connection groove; the third light shielding portion is closer to the side wall than the light source; an orthographic projection of the light source on the side wall is located within an orthographic projection of the third light shielding portion on the side wall.

* * * * *